US012518797B2

(12) United States Patent
Hu

(10) Patent No.: US 12,518,797 B2
(45) Date of Patent: Jan. 6, 2026

(54) DATA PROCESSING METHOD AND STORAGE MEDIUM

(71) Applicant: Tencent Technology (Shenzhen) Company Limited, Guangdong (CN)

(72) Inventor: Ying Hu, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 243 days.

(21) Appl. No.: 18/224,165

(22) Filed: Jul. 20, 2023

(65) Prior Publication Data

US 2023/0360678 A1      Nov. 9, 2023

Related U.S. Application Data

(63) Continuation of application No. PCT/CN2022/099706, filed on Jun. 20, 2022.

(30) Foreign Application Priority Data

Jul. 12, 2021   (CN) .......................... 202110785828.2

(51) Int. Cl.
   *G11B 27/10*          (2006.01)
(52) U.S. Cl.
   CPC .................................. *G11B 27/10* (2013.01)
(58) Field of Classification Search
   CPC .... H04N 13/363; H04N 21/44; H04N 13/161; H04N 5/2621; H04N 5/2622;
   (Continued)

(56) References Cited

U.S. PATENT DOCUMENTS

2018/0041820 A1   2/2018   Xu et al.
2020/0053435 A1   2/2020   Denoual et al.
(Continued)

FOREIGN PATENT DOCUMENTS

CN   111131898 A    5/2020
CN   102388613      3/2021
(Continued)

OTHER PUBLICATIONS

International Search Report issued Sep. 20, 2022 in International (PCT) Application No. PCT/CN2022/099706.
(Continued)

*Primary Examiner* — Thai Q Tran
*Assistant Examiner* — Nienru Yang
(74) *Attorney, Agent, or Firm* — Crowell & Moring LLP

(57) ABSTRACT

A data processing method for volumetric media is disclosed. The method includes: obtaining alternative relationship indication information and alternative attribute information between every two playout groups in at least two playout groups of volumetric media, the alternative relationship indication information being for indicating a media track pair having an alternative relationship in every two playout groups, and the alternative attribute information being for reflecting an attribute difference between media tracks in the media track pair having the alternative relationship; and transmitting the alternative relationship indication information and the alternative attribute information to a playout terminal, so as to instruct the playout terminal to identify a target playout group matching with the playout terminal from the at least two playout groups according to the alternative relationship indication information and the alternative attribute information, and to decode the target playout group to obtain the volumetric media.

20 Claims, 8 Drawing Sheets

(58) Field of Classification Search
CPC ...... H04N 5/2627; H04N 5/2628; H04N 7/06; H04N 7/08; H04N 7/0884; H04N 13/178; H04N 21/23602; H04N 21/472; H04N 21/482; H04N 21/485; H04N 23/64; H04N 23/695; G11B 27/10
USPC .......................................................... 386/239
See application file for complete search history.

(56) References Cited

U.S. PATENT DOCUMENTS

| | | | |
|---|---|---|---|
| 2021/0194946 A1* | 6/2021 | Hannuksela | H04N 21/85406 |
| 2021/0209806 A1* | 7/2021 | Oh | H04N 19/597 |
| 2021/0209807 A1 | 7/2021 | Oh | |

FOREIGN PATENT DOCUMENTS

| | | |
|---|---|---|
| CN | 112804256 | 5/2021 |
| CN | 112887733 | 6/2021 |

OTHER PUBLICATIONS

Office action issued in Chinese application. No. 202110785828.2, dated Dec. 27, 2024, 11 pages (with English translation).

\* cited by examiner

DATA PROCESSING METHOD AND STORAGE MEDIUM

RELATED APPLICATION

This application is a continuation application of PCT Patent Application No. PCT/CN2022/099706, filed on Jun. 20, 2022, which claims priority to Chinese Patent Application No. 2021107858282, entitled "DATA PROCESSING METHOD AND APPARATUS FOR VOLUMETRIC MEDIA, DEVICE, AND STORAGE MEDIUM" filed to the China National Intellectual Property Administration on Jul. 12, 2021, wherein the content of the above-referenced applications is incorporated herein by reference in its entirety.

FIELD OF THE TECHNOLOGY

This application relates to the technical field of computers, particularly to the technical field of point clouds, and more particularly to a data processing method and apparatus for volumetric media, a device and a storage medium.

BACKGROUND OF THE DISCLOSURE

With the development of three-dimension (3D) scene capture and rendering technology, the innovation of 3D volumetric media characterized by high degree of freedom and true 3D is promoted. For example, a point cloud technology has been widely used as a typical representative of volumetric media content and services. Point cloud is a set of discrete points that are irregularly distributed in space and express the spatial structure and surface attributes of 3D objects or scenes. Each point in the point cloud has at least 3D position information, and may also have color, material, or other information depending on application scenes. In addition, as another application of volumetric media, for multi-view videos and free viewpoints, 3D scene information is captured using real or virtual cameras, and presentation of 3D scenes with six degrees of freedom (6DoF) in a limited viewing position and direction range is supported.

The volumetric media usually include multiple media tracks, such as video tracks, audio tracks, and text tracks. In practice, it is found that when there is a certain relationship between the media tracks of the volumetric media, a playout terminal only needs to decode part of the media tracks of the volumetric media to reconstruct and present the volumetric media. For example, when the volumetric media include two video tracks having an alternative relationship, only one of the video tracks needs to be decoded by the playout terminal. However, because the playout terminal cannot identify an association relationship between the media tracks, the playout terminal needs to decode all the media tracks of the volumetric media, thus causing waste of processing resources of the playout terminal.

SUMMARY

According to various embodiments provided by this disclosure, a data processing method and apparatus for volumetric media, a device, and a storage medium are provided.

An aspect of the embodiments of this disclosure provides a data processing method for volumetric media. The method is performed by a service device, and includes:
obtaining alternative relationship indication information and alternative attribute information between every two playout groups in at least two playout groups of volumetric media, the alternative relationship indication information being for indicating a media track pair having an alternative relationship in every two playout groups, and the alternative attribute information being for reflecting an attribute difference between media tracks in the media track pair having the alternative relationship.

transmitting the alternative relationship indication information and the alternative attribute information to a playout terminal, so as to instruct the playout terminal to identify a target playout group matching with the playout terminal from the at least two playout groups according to the alternative relationship indication information and the alternative attribute information, and to decode the target playout group to obtain the volumetric media.

An aspect of the embodiments of this disclosure provides a data processing method for volumetric media. The method is performed by a service device, and includes:
obtaining at least two playout groups of volumetric media;
flagging every two playout groups in the at least two playout groups to obtain alternative relationship indication information and alternative attribute information between every two playout groups, the alternative relationship indication information being for indicating a media track pair having an alternative relationship in every two playout groups, and the alternative attribute information being for reflecting an attribute difference between media tracks in the media track pair having the alternative relationship; and
transmitting the alternative relationship indication information and the alternative attribute information to a playout terminal, so as to instruct the playout terminal to identify a target playout group matching with the playout terminal from the at least two playout groups according to the alternative relationship indication information and the alternative attribute information, and to decode the target playout group to obtain the volumetric media.

An aspect of the embodiments of this disclosure provides a data processing method for volumetric media. The method is performed by a playout terminal, and includes:
obtaining alternative relationship indication information and alternative attribute information between every two playout groups in at least two playout groups of volumetric media, the alternative relationship indication information being used for indicating a media track pair having an alternative relationship in every two playout groups, and the alternative attribute information being used for reflecting an attribute difference between media tracks in the media track pair having the alternative relationship;
identifying a target playout group matching with the playout terminal from the at least two playout groups according to the alternative relationship indication information and the alternative attribute information; and
decoding the target playout group to obtain the volumetric media.

An aspect of this disclosure provides a computer program product, including computer-readable instructions. When the computer-readable instructions are executed by one or more processors, the steps in the various method embodiments of this disclosure are implemented.

An aspect of the embodiments of this disclosure provides one or more computer-readable storage media. The computer-readable storage medium stores computer-readable instructions. The computer-readable instructions include program instructions. The program instructions, when executed by a processor, implement the steps in the various method embodiments of this disclosure.

Details of one or more embodiments of this disclosure are provided in the accompanying drawings and descriptions below. Other features, objectives, and advantages of this disclosure become apparent from the specification, the drawings, and the claims.

BRIEF DESCRIPTION OF THE DRAWINGS

To describe the technical solutions in the embodiments of this disclosure or in the related art more clearly, the following briefly introduces the accompanying drawings for describing the embodiments or the related art. Apparently, the accompanying drawings in the following description show merely some embodiments of this disclosure, and a person of ordinary skill in the art may still derive other drawings from the accompanying drawings without creative efforts.

DESCRIPTION OF EMBODIMENTS

The technical solutions in embodiments of this disclosure are clearly and completely described in the following with reference to the accompanying drawings in the embodiments of this disclosure. Apparently, the described embodiments are merely some rather than all of the embodiments of this disclosure. Based on the embodiments in this disclosure, all the other embodiments obtained by a person of ordinary skill in the art without involving any inventive effort fall within the scope of protection of this disclosure.

Embodiments of this disclosure relate to a data processing technology for volumetric media. The volumetric media (visual volumetric video-based coding media) refer to immersive media which capture visual content from a 3D space and provide 3DoF+ and 6DoF viewing experiences, are coded by traditional videos, and contain volumetric video type tracks in file encapsulation, including multi-perspective video, video coded point cloud, and the like.

Figure 1:
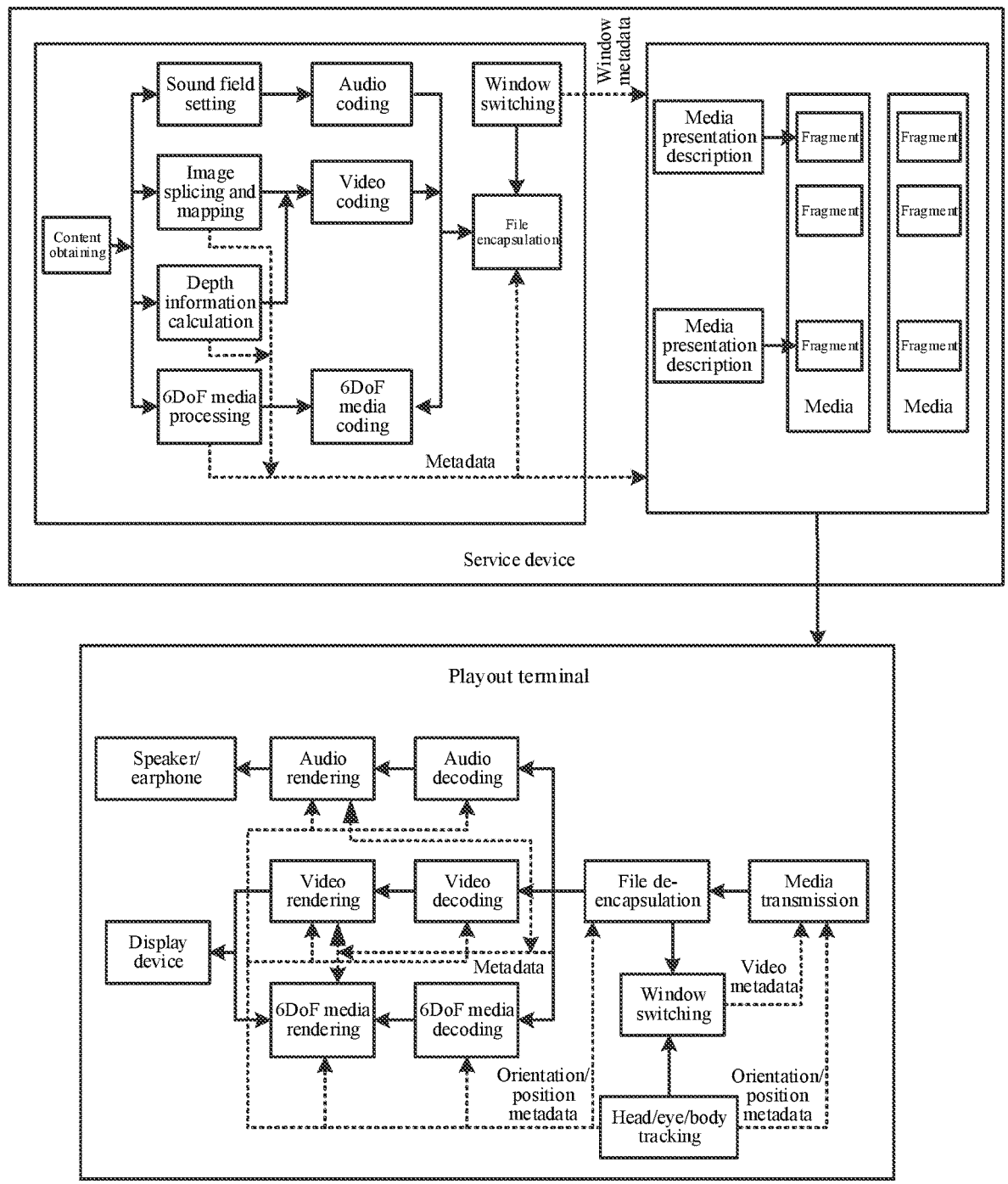
FIG. 1 shows an architecture diagram of a volumetric media system according to an embodiment of this disclosure.

FIG. 1 shows an architecture diagram of a volumetric media system according to an exemplary embodiment of this disclosure. As shown in FIG. 1, the volumetric media system includes a service device and a playout terminal. The service device may refer to a computer device used by a provider of volumetric media. The computer device may be a terminal (for example, a personal computer (PC), a smart mobile device (for example, a smartphone), and the like) or a server. The server may be an independent physical server, a server cluster or a distributed system composed of multiple physical servers, or a cloud server providing basic cloud computing services, such as a cloud service, a cloud database, cloud computing, a cloud function, cloud storage, a network service, cloud communication, a middleware service, a domain name service, a security service, a content delivery network (CDN), and big data and artificial intelligence platforms. The playout terminal may refer to a computer device used by a user of the volumetric media. The computer device may be a terminal (for example, a PC, a smart mobile device (for example, a smartphone), or a VR device (for example, a VR helmet, VR glasses, and the like)). The data processing procedure for volumetric media includes a data processing procedure on the service device side and a data processing procedure on the playout terminal side.

The data processing procedure on the service device side mainly includes: (1) processes of obtaining and producing media content of the volumetric media; and (2) processes of coding the volumetric media and encapsulating files. The data processing procedure on the playout terminal side mainly includes: (3) processes of de-encapsulating and decoding files of the volumetric media; and (4) a process of rendering the volumetric media. In addition, a transmission process for the volumetric media is involved between the service device and the playout terminal. The transmission process may be performed based on various transport protocols. The transport protocols may include, but are not limited to: a dynamic adaptive streaming over HTTP (DASH) protocol, a moving picture experts group media transport (MMT) protocol, an HTTP live streaming (HLS) protocol, a smart media transport protocol (SMTP), a transmission control protocol (TCP), and the like.

The following will describe various processes involved in the data processing procedure for volumetric media in detail below with reference to FIG. 1.

1. Data Processing Procedure on Service Device Side:

(1) Processes of Obtaining and Producing Media Content of Volumetric Media

1) Process of Obtaining Media Content of Volumetric Media

The media content of the volumetric media is obtained by capturing an audio-visual scene of the real world by a capture device. In one implementation, the capture device may refer to a hardware component disposed in the service device. For example, the capture device refers to a microphone, a camera, a sensor, and the like of a terminal. In another implementation, the capture device may also be a hardware apparatus connected to the service device, such as a camera connected to the service device. The capture device is configured to provide a service for obtaining the media content of the volumetric media to the service device. The capture device may include, but is not limited to: an audio device, a camera device, and a sensing device. The audio device may include an audio sensor, a microphone, and the like. The camera device may include an ordinary camera, a stereo camera, a light field camera, and the like. The sensing device may include a laser device, a radar device, and the like. There may be multiple capture devices, such as camera arrays. The capture devices are deployed at some specific positions in a real space to simultaneously capture audio and video content at different angles within the space. The audio content and the video content in the audio and video content are synchronized both in time and space.

(2) Process of Producing Media Content of Volumetric Media

The captured audio content is content suitable for audio coding of volumetric media to be executed. After a series of production processes, the captured video content may become content suitable for video coding of the volumetric media to be executed. The production processes include:

(1) Splicing. Since the captured video content is shot by the capture device at different angles, the splicing refers to splicing the video contents shot at different angles into a complete video that can reflect the 360-degree visual panorama of a real space. That is, the spliced video is a panoramic video (or spherical video) represented in a 3D space.

(2) Projection. The projection refers to the process of mapping a 3D video formed by splicing to a 2-dimension (2D) image. The 2D image formed by projection is referred to as a projection image. The mode of projection may include, but is not limited to: longitude and latitude graph projection and regular hexahedron projection.

(3) Region encapsulation. The projection image may be coded directly, or the projection image may be coded after region encapsulation. In practice, it is found that in the data processing procedure of volumetric media, the video coding efficiency of volumetric media can be greatly improved by coding 2D projection images after region encapsulation, and therefore the region encapsulation technology is widely used in the video processing procedure of volumetric media. The region encapsulation refers to a process of performing transformation processing on the projection image by region, and the region encapsulation process converts the projection image into an encapsulation image. The region encapsulation process specifically includes: dividing the projection image into multiple mapping regions, transforming the multiple mapping regions to obtain multiple encapsulation regions, and then mapping the multiple encapsulation regions into a 2D image to obtain the encapsulation image. The mapping region refers to a region divided in the projection image before the region encapsulation is performed. The encapsulation region refers to a region located in the encapsulation image after the region encapsulation is performed. The transformation may include, but is not limited to: mirroring, rotating, rearranging, up-sampling, down-sampling, changing the resolution of the region, and moving.

Figure 2:
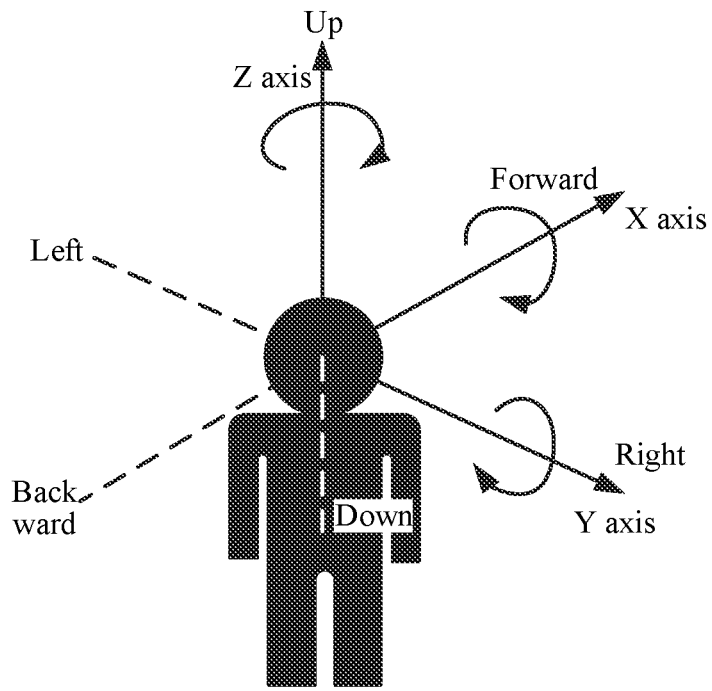
FIG. 2 shows a schematic diagram of 6DoF according to an embodiment of this disclosure.
Figure 3:
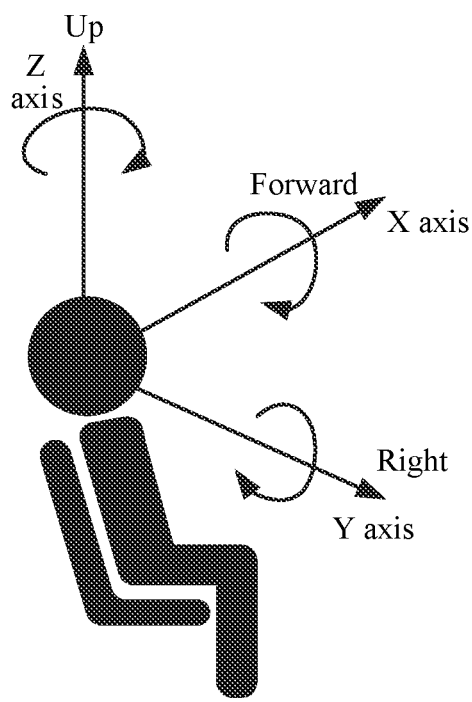
FIG. 3 shows a schematic diagram of 3DoF according to an embodiment of this disclosure.
Figure 4:
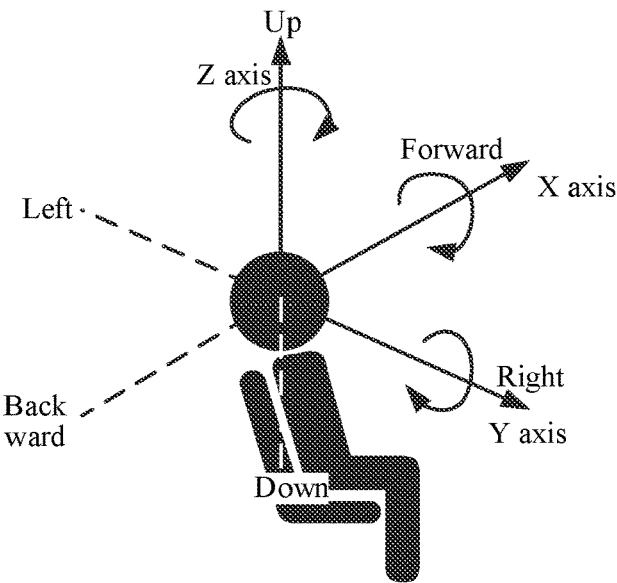
FIG. 4 shows a schematic diagram of 3DoF+ according to an embodiment of this disclosure.

The capture device can only capture a panoramic video, after the video is processed by the service device and transmitted to the playout terminal for corresponding data processing, a user on the playout terminal side can only view 360-degree video information by executing some specific actions (such as head rotation), while the corresponding video change cannot be obtained by executing non-specific actions (such as head movement), and the VR experience is not good. Therefore, it is necessary to provide additional depth information matching with the panoramic video to make the user obtain better immersion and better VR experience, which relates to a 6DoF production technology. When the user is movable freely in a simulated scene, it is referred to as 6DoF. When using the 6DoF production technology to produce video content of volumetric media, the capture device usually selects a light field camera, a laser device, a radar device, and the like, to capture point cloud data or light field data in space, and some specific processes need to be carried out in the process of executing the production processes (1)-(3), such as cutting and mapping point cloud data, and calculating depth information. FIG. 2 shows a schematic diagram of 6DoF according to an exemplary embodiment of this disclosure. 6DoF is divided into window 6DoF, omnidirectional 6DoF and 6DoF. The window 6DoF means that the user is limited in rotation and movement in an X axis and a Y axis, and limited in translation in a Z axis. For example, the user cannot see a scene outside a window frame, and the user cannot pass through the window. The omnidirectional 6DoF means that the rotational movement of the user in the X axis, the Y axis, and the Z axis is limited. For example, the user cannot freely pass through 3D 360-degree VR content in a limited movement region. The 6DoF means that the user may freely translate along the X axis, the Y axis, and the Z axis. For example, the user may freely walk in the 3D 360-degree VR content. Similar to the 6DoF, there are 3DoF and 3DoF+ production technologies. FIG. 3 shows a schematic diagram of 3DoF according to an exemplary embodiment of this disclosure. As shown in FIG. 3, 3DoF means that the user is fixed at a center point of a 3D space, and the head of the user rotates along the X axis, the Y axis, and the Z axis to view a picture provided by media content. FIG. 4 shows a schematic diagram of 3DoF+ according to an exemplary embodiment of this disclosure. As shown in FIG. 4, 3DoF+ means that when a virtual scene provided by volumetric media has certain depth information, the head of the user head may move in a limited space based on 3DoF to view the picture provided by the media content.

(2) Processes of Coding Volumetric Media and Encapsulating Files

The captured audio content may be directly audio-coded to form audio tracks of the volumetric media. After the production processes (1)-(2) or (1)-(3), the video content is video-coded to obtain video tracks of the volumetric media. For example, a projection graph is coded to obtain a volumetric video track carrying a mapping relationship between 2D and 3D. An encapsulation image is coded to obtain a volumetric video track carrying encapsulation data. A video stream carrying attribute data and a video stream carrying position data are obtained from the panoramic video represented by the 3D space. The video stream carrying the attribute data is coded to obtain a volumetric video track carrying the attribute data. The attribute data refers to color information, material, and other attributes of a photographing object. The video stream carrying the position data is coded to obtain a volumetric video track carrying the position data. The position data refers to 3D position information of the photographing object.

The video coding mode may include, but is not limited to: video coding includes advanced video coding (AVC), audio video coding standard (AVS), high efficiency video coding (HEVC/H.265), and versatile video coding (VVC/H.266), etc. In order to adapt to different application scenes, the service device may use different video coding modes to code the video content, so as to obtain a media track pair having an alternative relationship. The media track pair having the alternative relationship is obtained by using different video coding modes for the same video content. That is, track categories of volumetric video tracks in the media track pair having the alternative relationship are the same. Usually, track identifiers are used for distinguishing between different volumetric video tracks, and alternative identifiers are used for identifying volumetric video tracks having the alternative relationship.

Figure 5:
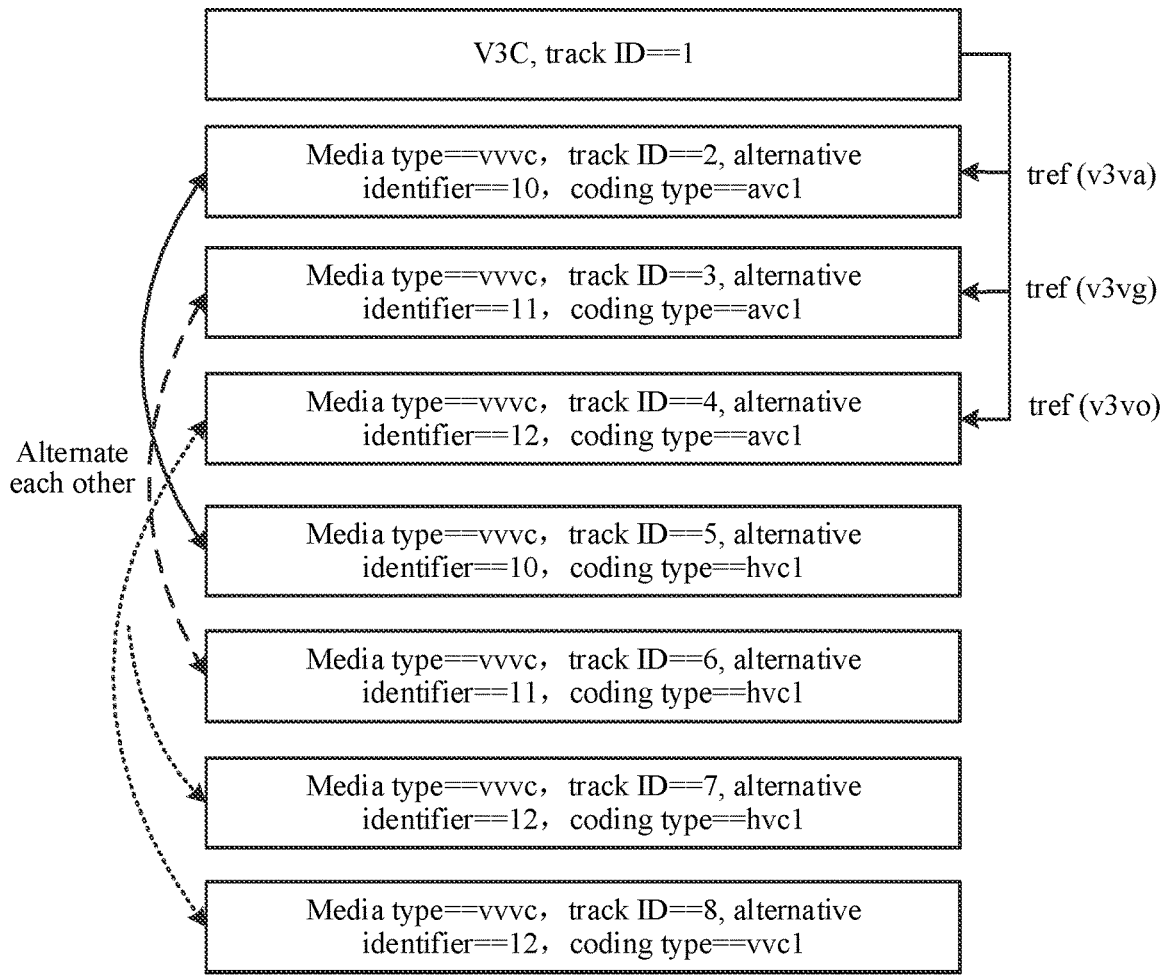
FIG. 5 shows a schematic diagram of a media track of volumetric media according to an embodiment of this disclosure.

For example, as shown in FIG. 5, FIG. 5 is a schematic diagram of an alternative relationship between volumetric video tracks in volumetric media V3C. The volumetric media include eight volumetric video tracks. The volumetric video tracks have track identifiers of 1-8. Volumetric video track 1 is a volumetric video track carrying a mapping relationship between 2D and 3D. The track categories of volumetric video track 2 and volumetric video track 5 are both volumetric video tracks carrying attribute data, and the coding modes of volumetric video track 2 and volumetric video track 5 are avc1 (AVC) and hevc1. Therefore, there is an alternative relationship between volumetric video track 2 and volumetric video track 5, and the alternative identifiers of volumetric video track 2 and volumetric video track 5 are 10. That is, volumetric video track 2 and volumetric video track 5 constitute media track pair 10. The track categories of volumetric video track 3 and volumetric video track 6 are both volumetric video tracks carrying position data, and the coding modes of volumetric video track 3 and volumetric video track 6 are avc1 and hevc1. Therefore, there is an alternative relationship between volumetric video track 3 and volumetric video track 6, and the alternative identifiers of volumetric video track 3 and volumetric video track 6 are 11. That is, volumetric video track 3 and volumetric video track 6 may constitute media track pair 11. The track categories of volumetric video track 4, volumetric video track 7, and volumetric video track 8 are all volumetric video tracks carrying placeholder data, and the coding modes of volumetric video track 4, volumetric video track 7, and volumetric video track 8 are avc1, hevc1, and vvc1. Therefore, there is an alternative relationship between any two of volumetric video track 4, volumetric video track 7, and volumetric video track 8, the alternative identifiers of volumetric video track 4, volumetric video track 7, and volumetric video track 8 are 12, and any two of volumetric video track 4, volumetric video track 7, and volumetric video track 8 constitute media track pair 12.

If the playout terminal decodes these volumetric video tracks to reconstruct and present the volumetric media, it is easy to waste the processing resources of the playout terminal. Based on this, in order to enable the playout terminal to select one volumetric video track in the media pair having the alternative relationship to be decoded, all the volumetric video tracks may be grouped to obtain multiple playout groups. The volumetric video tracks in the playout group have a joint playout relationship. That is, the volumetric video tracks in the playout group may constitute complete volumetric media (namely, volumetric video), and the playout group only includes one volumetric video track in the media pair having the alternative relationship. In FIG. 5, the volumetric tracks may constitute multiple playout groups. As shown in FIG. 5, volumetric video tracks 1-4 may constitute playout group 1, volumetric video track 1 and volumetric video tracks 5-7 may constitute playout group 2, and volumetric video track 1, volumetric video tracks 5-6, and volumetric video track 8 may constitute playout group 3. Certainly, the combination of other volumetric video tracks may also constitute a playout group.

The audio coding includes, but is not limited to: moving picture experts group audio layer III (MP3), advanced audio coding (AAC), and free lossless audio codec (FLAC). The service device may generate an audio track pair having an alternative relationship using different audio coding modes, may add an audio track (one of audio tracks in the audio track pair having the alternative relationship) to each playout group, and may generate alternative relationship indication information and alternative attribute information of every two playout groups. The alternative relationship indication information is used for indicating the media track pair having the alternative relationship in every two playout groups. The alternative attribute information is used for reflecting an attribute difference between media tracks (such as volumetric video tracks or audio tracks) in the media track pair having the alternative relationship. Here, the attribute difference may include coding modes of the media tracks in the media track pair, and the like. Further, the playout group, the alternative relationship indication information, and the alternative attribute information may be encapsulated in a file container according to a file format of the volumetric media (for example, an ISO base media file format (ISOBMFF)) to form a media file resource of the volumetric media. The media file resource may be a media file or a media file in which media fragments form the volumetric media. Metadata of the media file resource of the volumetric media is recorded by using media presentation description (MPD) according to file format requirements of the volumetric media. The metadata is a general term for information related to the presentation of the volumetric media. The metadata may include description information of media content, description information of a window, signaling information related to the presentation of the media content, and the like. As shown in FIG. 1, the service device stores the MPD and the media file resource formed after data processing.

2. Data Processing Procedure on Playout Terminal Side:

(3) Processes of De-Encapsulating and Decoding Files of Volumetric Media

The playout terminal may adaptively and dynamically obtain the media file resource of the volumetric media and the corresponding MPD from the service device through the recommendation of the service device or according to the processing capacity of the playout terminal. For example, the playout terminal may request the corresponding media file resource from the service device according to the decoding capacity of the playout terminal. The media file resource and the MPD are transmitted from the service device to the playout terminal through a transport mechanism (such as DASH or SMT). The process of file de-encapsulation on the playout terminal side is opposite to the process of file encapsulation on the service device side. The playout terminal de-encapsulates the media file resource according to the file format requirements of the volumetric media to obtain audio tracks and volumetric video tracks. The decoding process on the playout terminal side is opposite to the coding process on the service device side. The playout terminal performs audio decoding on the audio tracks and restores audio content. In addition, the playout terminal decodes the volumetric video tracks to obtain video content.

(4) Process of Rendering Volumetric Media

The playout terminal renders the audio content obtained by audio decoding and a 3D image obtained by video decoding according to the metadata related to rendering and window in the MPD, and the playout output of the 3D image is realized when the rendering is completed. Particularly, if the production technologies of 3DoF and 3DoF+ are adopted, the playout terminal mainly renders the 3D image based on the current viewpoint, parallax, depth information, and the like. If the production technology of 6DoF is adopted, the playout terminal mainly renders the 3D image in the window based on the current viewpoint. The viewpoint refers to a viewing position point of the user, the parallax refers to a line-of-sight difference caused by the binocular eyes of the user or a line-of-sight difference caused by motion, and the window refers to a viewing region.

The volumetric media system supports a data box. The data box is obtained by encapsulating playout groups of the volumetric media, alternative relationship indication information between every two playout groups, alternative attribute information, and data blocks or objects of metadata.

To sum up, in this disclosure, by transmitting the alternative relationship indication information and the alternative attribute information to the playout terminal, it is beneficial for the playout terminal to adaptively select a playout group for decoding according to a processing capacity of the playout terminal or user requirements, so as to reconstruct and present volumetric media, and realize personalized presentation. In addition, decoding of all media tracks is not required, thereby saving processing resources of the playout terminal.

Figure 6:
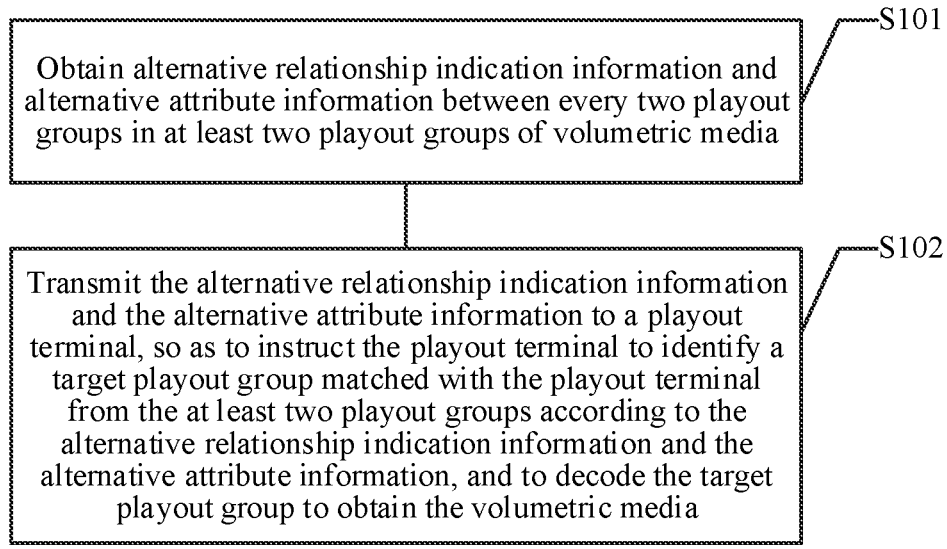
FIG. 6 is a schematic flowchart of a data processing method for volumetric media according to an embodiment of this disclosure.

Further, FIG. 6 is a schematic flowchart of a data processing method for volumetric media according to an embodiment of this disclosure. As shown in FIG. 6, the method may be performed by an application service device in FIG. 1. The method may at least include the following S101-S102:

S101: Obtain alternative relationship indication information and alternative attribute information between every two playout groups in at least two playout groups of volumetric media. The alternative relationship indication information is used for indicating a media track pair having an alternative relationship in every two playout groups, and the alternative attribute information is used for reflecting an attribute difference between media tracks in the media track pair having the alternative relationship.

In this disclosure, the media tracks in the media track pair may refer to volumetric video tracks, audio tracks, text tracks, and the like. One media track pair or at least two media track pairs having an alternative relationship are included between every two playout groups of the volumetric media. The attribute difference between the media tracks in the media track pair may be used for reflecting a quality difference of the playout groups. The attribute difference between the media tracks in the media track pair may include attribute information of each media track in the media track pair. The media track attribute information includes one or more of a coding mode, a transmission rate, a quality ranking, and a coding type of the coding mode. The coding mode may include a video coding mode and an audio coding mode. The coding type of the coding mode may include a lossy coding mode, a lossless coding mode, and the like.

The attribute information of a media track may be used for reflecting the playout quality of the media track, and further, may be used for reflecting the playout quality of a playout group to which the media track belongs. For example, the playout quality of a media track in which the coding type of the coding mode is a lossless coding type is superior to that of a media track in which the coding type of the coding mode is a lossy coding type. At the same time, transmission resources (such as network bandwidth) consumed by the channel transmission of the media track and resources consumed by the playout terminal processing the media track are related to the playout quality of the media track. If the quality ranking of the media track is higher, there are more transmission resources consumed by the channel transmission of the media track and resources consumed by the playout terminal processing the media track. On the contrary, if the quality ranking of the media track is lower, there are fewer transmission resources consumed by the channel transmission of the media track and resources consumed by the playout terminal processing the media track.

In an exemplary implementation, the media track pair includes a first media track belonging to a playout group $P_m$ and a second media track belonging to a playout group $P_n$, alternative attribute information between the playout group $P_m$ and the playout group $P_n$ includes attribute information of the first media track and attribute information of the second media track, m and n are both positive integers less than Z, and Z is a quantity of groups of the at least two playout groups. The attribute information of the first media track includes a coding mode of the first media track, the attribute information of the second media track includes a coding mode of the second media track, and the coding mode of the first media track is different from the coding mode of the second media track. For example, the first media track and the second media track are both volumetric video tracks, the coding mode of the first media track is avc1, and the coding mode of the second media track is hevc1. The coding modes of the media tracks are flagged, so as to more finely obtain the quality difference between the playout groups. Further, it is advantageous for the playout terminal to quickly identify the playout group matching with the processing capacity of the playout terminal or the playout group matching with the user demand.

In an exemplary implementation, the attribute information of the first media track further includes one or more of a transmission rate, a structure organization, a quality ranking, and a coding type corresponding to the coding mode of the first media track. The attribute information of the second media track further includes at least one of a transmission rate, a structure organization, a quality ranking, and a coding type corresponding to the coding mode of the second media track. The transmission rate includes one or both of a frame rate or a bit rate of the media track. The attribute information of the media track is flagged by multiple dimensions, thereby providing more difference attributes between the playout groups for the playout terminal, which is advantageous for the playout terminal to select the playout group matching therewith more accurately.

In an exemplary implementation, the alternative relationship indication information further includes an alternative level field. When the alternative level field in the alternative relationship indication information between the playout group $P_m$ and the playout group $P_n$ is a first value (for example, 1), the alternative level field is used for reflecting that an alternative level between the playout group $P_m$ and the playout group $P_n$ is a media content level. When the alternative level field in the alternative relationship indication information between the playout group $P_m$ and the playout group $P_n$ is a second value (for example, 0), the alternative level field is used for reflecting that an alternative level between the playout group $P_m$ and the playout group $P_n$ is a track level.

In an exemplary implementation, when the alternative level between the playout group $P_m$ and the playout group $P_n$ is the media content level, a quantity of the media track pair having the alternative relationship in the playout group $P_m$ and the playout group $P_n$ is R, R is a quantity of media tracks in the playout group $P_m$, and the quantity of media tracks in the playout group $P_m$ is the same as a quantity of tracks in the playout group $P_n$. That is to say, when the alternative level between the playout group $P_m$ and the playout group $P_n$ is the media content level, the media tracks in the playout group $P_m$ and the playout group $P_n$ have a one-to-one alternative relationship.

Figure 7:
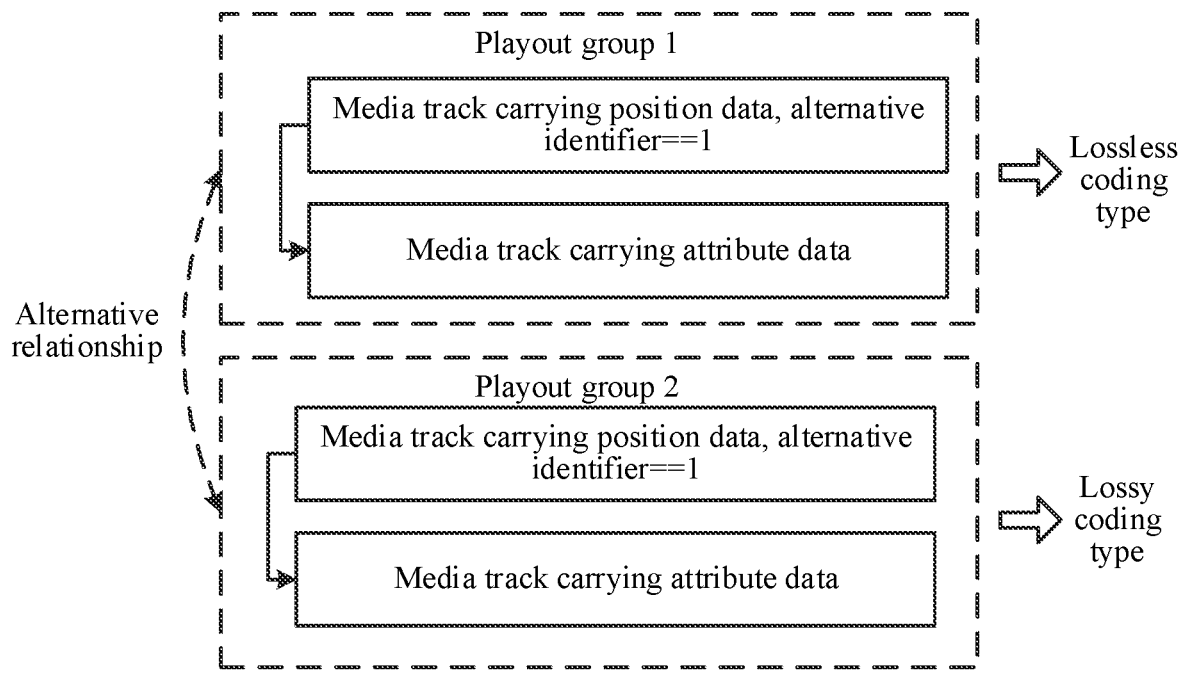
FIG. 7 shows a schematic diagram of a media track of volumetric media according to an embodiment of this disclosure.

For example, as shown in FIG. 7, the volumetric media include two playout groups: playout group 1 and playout group 2. Playout group 1 and playout group 2 each include a media track carrying position data and a media track carrying attribute data. The coding type of the coding mode of each media track in playout group 1 is a lossless coding type, and the coding type of the coding mode of each media track in playout group 2 is a lossy coding type. Therefore, there is an alternative relationship between the media track carrying the position data in playout group 1 and the media track carrying the position data in playout group 2, and a media track pair may be constituted. Similarly, there is an alternative relationship between the media track carrying the attribute data in playout group 1 and the media track carrying the attribute data in playout group 2, and a media track pair may be constituted. It can be seen that the quantity of tracks in playout group 1 and the quantity of tracks in playout group 2 are both 2, and the media track pair between playout group 1 and playout group 2 is 2. Therefore, the alternative level between playout group 1 and playout group 2 may be referred to as the media content level.

In an exemplary implementation, when the alternative level between the playout group $P_m$ and the playout group $P_n$ is the track level, a quantity of the media track pair having the alternative relationship in the playout group $P_m$ and the playout group $P_n$ is a positive integer less than R. That is to say, when the alternative level between the playout group $P_m$ and the playout group $P_n$ is the track level, the media tracks in the playout group $P_m$ and the media tracks in the playout group $P_n$ do not have an alternative relationship. That is, some media tracks in the playout group $P_m$ and the media tracks in the playout group $P_n$ have the alternative relationship.

Figure 8:
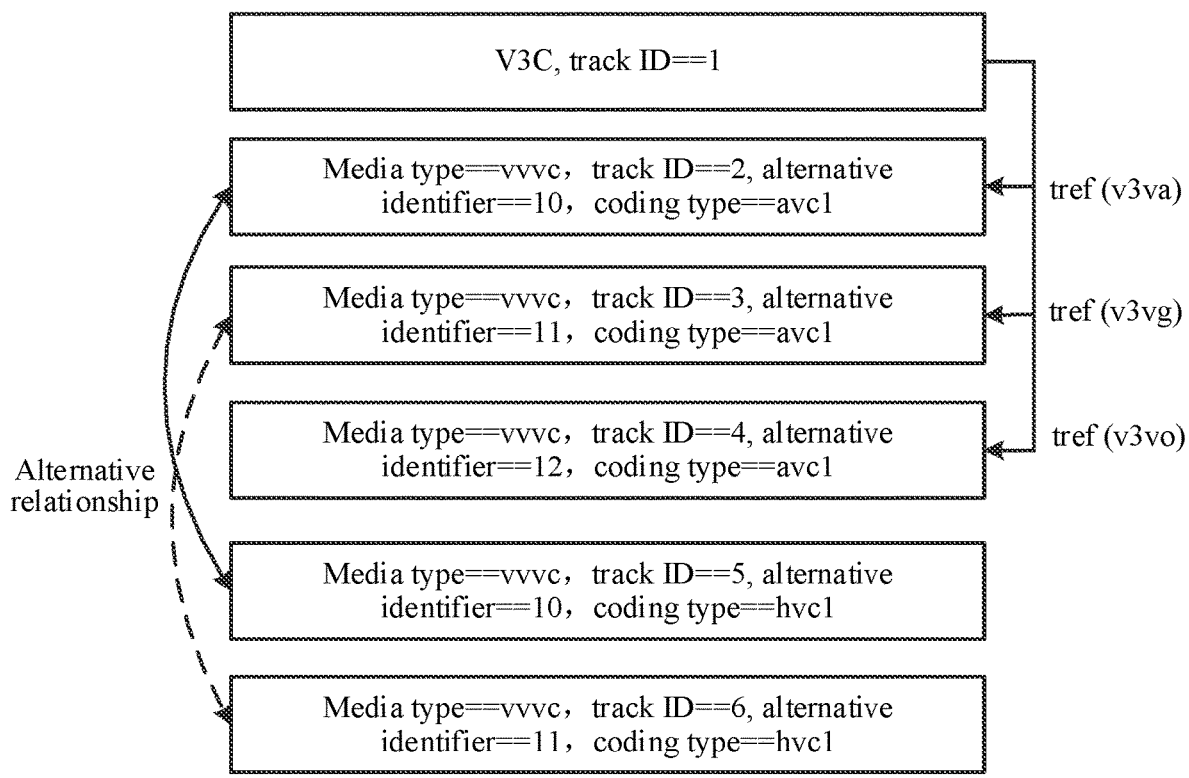
FIG. 8 shows a schematic diagram of a media track of volumetric media according to an embodiment of this disclosure.

For example, as shown in FIG. 8, the volumetric media include six volumetric video tracks: volumetric video tracks 1-6. Volumetric video track 1 is a volumetric video track carrying a mapping relationship between 2D and 3D. The playout groups of the volumetric media may at least include playout group 1 and playout group 2. Playout group 1 may include volumetric video track 1, volumetric video track 2, and volumetric video track 3. Playout group 2 may include volumetric video track 1, volumetric video track 5, and volumetric video track 6. The track categories of volumetric video track 2 and volumetric video track 5 are both volumetric video tracks carrying attribute data, and the coding modes of volumetric video track 2 and volumetric video track 5 are avc1 and hevc1. Therefore, there is an alternative relationship between volumetric video track 2 and volumetric video track 5, and the alternative identifiers of volumetric video track 2 and volumetric video track 5 are 10. That is, volumetric video track 2 and volumetric video track 5 constitute media track pair 10. The track categories of volumetric video track 3 and volumetric video track 6 are both volumetric video tracks carrying position data, and the coding modes of volumetric video track 3 and volumetric video track 6 are avc1 and hevc1. Therefore, there is an alternative relationship between volumetric video track 3 and volumetric video track 6, and the alternative identifiers of volumetric video track 3 and volumetric video track 6 are 11. That is, volumetric video track 3 and volumetric video track 6 may constitute media track pair 11. It can be seen that the quantity of media track pairs between playout group 1 and playout group 2 is 2, and the quantity of tracks in playout group 1 and the quantity of tracks in playout group 2 are both 3. That is, the quantity of media track pairs between playout group 1 and playout group 2 is smaller than the quantity of tracks in playout group 1. Therefore, the alternative level between playout group 1 and playout group 2 may be referred to as the track level.

In an exemplary implementation, when the alternative level between the playout group $P_m$ and the playout group $P_n$ is the media content level, coding modes of the media tracks in the playout group $P_m$ are a first coding mode. Coding modes of the media tracks in the playout group $P_n$ are a second coding mode. The media tracks in the playout group are coded by the same coding mode, which is advantageous for the playout terminal to decode the media tracks quickly and obtain the volumetric media quickly, thereby improving the efficiency of reconstructing the volumetric media.

In an exemplary implementation, the media tracks in each playout group in the at least two playout groups have a joint playout relationship, and the track categories of the media tracks in each playout group are different. The track categories of the media tracks in the media track pair having the alternative relationship in every two playout groups are identical. The track categories may be used for reflecting content contained in the media tracks. If the track categories include audio tracks, video tracks, text tracks, and the like, the track categories of the video tracks may be further subdivided according to data carried by the video tracks. The track categories of the video tracks include volumetric video tracks carrying a mapping relationship between 2D and 3D, volumetric video tracks carrying attribute data, volumetric video tracks carrying position data, and the like. The media tracks having a joint playout relationship may mean that the volumetric media may be reconstructed according to the media tracks having the joint playout relationship. That is, the complete volumetric media may be constituted.

In an exemplary implementation, the alternative relationship indication information includes an alternative identifier of the media track pair having the alternative relationship in every two playout groups.

The service device may obtain alternative relationship indication information and alternative attribute information between every two playout groups in at least two playout groups of volumetric media through a data box or a transport protocol of the volumetric media.

For example, the service device may obtain a data box of the volumetric media. The data box of the volumetric media includes the alternative relationship indication information and the alternative attribute information between every two playout groups. The data box may further include at least two playout groups of the volumetric media. That is, the data box may be obtained by encapsulating at least two playout groups of the volumetric media, the alternative relationship indication information, and the alternative attribute information. For example, the syntax of the data box based on the volumetric media may be seen in Table 1 below:

TABLE 1

```
aligned(8) class PlayoutTrackGroupBox extends TrackGroupTypeBox('potg') {
  // track_group_id is inherited from TrackGroupTypeBox
  unsigned int(1) is_content_alternative;
  unsigned int(1) alternative_info_flag;
  bit(6) reserved;
  if(alternative_info_flag){
PlayoutAlternativeInfoBox( );
  }
}
aligned(8) class PlayoutAlternativeInfoBox extends fullbox('poai') {
unsigned int(8) alternative_type;
if(alternative_type&& 00000001){
    unsigned int(8) quality_ranking;
}
if(alternative_type&& 00000010){
    unsigned int(1) lossless_flag;
  bit(7) reserved
}
if(alternative_type == 00000100){
    unsigned int(32) bitrate;
}
if(alternative_type == 00001000){
    unsigned int(8) framerate;
}
if(alternative_type == 00010000){
    unsigned int(32) codec_type;
}
if(alternative_type == 00100000){
    unsigned int(1) is_tile_based;
  bit(7) reserved;
}
}
aligned(8) class PlayoutEntity ToGroupBox extends Entity ToGroupBox('eply') {
unsigned int(1) is_content_alternative;
  unsigned int(1) alternative_info_flag;
  bit(6) reserved;
  if(alternative_info_flag){
PlayoutAlternativeInfoBox( );
  }
}
``` where is_content_alternative in Table 1 is the alternative level field between two playout groups. If the value of the field is 1, the alternative level between the two playout groups is the media content level. If the value of the field is 0, the alternative level between the two playout groups is the track level. That is, there is an alternative relationship between some tracks in the two playout groups. alternative_info_flag is an alternative identification field. If the value of the field is 1, the media track in the playout group carries differentiation information. That is, the media track is a media track in the media track pair. If the value of the field is 0, the media track does not carry differentiation information. That is, the media track does not belong to a media track in the media track pair. PlayoutAlternativeInfoBox is a data box field, alternative_type is a difference attribute type of an alternative track, and the track may have one or more difference attributes according to the value of the difference type. quality_ranking is a quality ranking field. As the value of the field is smaller, the quality of the corresponding track is higher. lossless_flag: if the value of the field is 0, the coding type of the coding mode corresponding to the media track is a lossy coding type, and if the value of the field is 1, the coding type of the coding mode corresponding to the media track is a lossless coding type. Bitrate is bit rate information of the media track, and indicates a bit rate of the corresponding media track. Framerate is frame rate information of the media track, and indicates a frame rate of the corresponding media track. codec_type is the coding mode of the media track, is_tile_based is a structure organization field of the track, and if the value of the field is 1, the media track has a tile structure organization. If the value of the field is 0, the media track is not divided into tiles. In the presence of the field, the value of is_content_alternative is required to be 1.

In an exemplary implementation, the service device may obtain a transport protocol of the volumetric media. The transport protocol includes the alternative relationship indication information and the alternative attribute information between every two playout groups. Specifically, when the transport protocol is a DASH protocol, the alternative relationship indication information and the alternative attribute information between every two playout groups are located in a track description field of the DASH protocol. When the transport protocol is an MMT protocol, the alternative relationship indication information and the alternative attribute information between every two playout groups are located in a resource group of the MMT protocol. By adding the alternative relationship indication information and the alternative attribute information to the transport protocol, the indication information (namely, the alternative relationship indication information and the alternative attribute information) and at least two playout groups may be individually encapsulated. In this way, the transmission information may be preferentially transmitted to the playout terminal, and the playout terminal may request the playout group matching with the playout terminal according to the transport protocol, thus avoiding the problem of network bandwidth waste caused by transmitting all the playout groups to the playout terminal and saving network bandwidth resources. For example, when the transport protocol is the DASH protocol, fields on the alternative relationship indication information and the alternative attribute information added to the DASH protocol are as shown in Table 2:

TABLE 2

| Element and attribute information | Necessity | Data type | Description |
|---|---|---|---|
| videoComponent@alternative_Id | O | xs:unsignedInt | representing an alternative identifier of a media track pair |
| videoComponent@quality_ranking | O | xs:unsignedByte | representing a quality ranking of a media track, where as the value of the field is smaller, the quality of the media track is higher |
| videoComponent@lossless_flag | O | Bool | indicating whether a coding type of a coding mode of the media track is lossless coding, if the value of the field is 0, the coding type of the coding mode of the media track is a lossy coding type, and the coding type of the coding mode of the media track is a lossless coding type |

In Table 2, the DASH protocol includes three extended fields: alternative_Id, quality_ranking, and lossless_flag, where alternative_Id represents the alternative identifier of the media track pair, and the data type is an unsigned integer type. quality_ranking represents a quality ranking of a media track, as the value of the field is smaller, the quality of the media track is higher, and the data type is an unsigned byte type. lossless_flag indicates whether a coding type of a coding mode of the media track is lossless coding, if the value of the field is 0, the coding type of the coding mode of the media track is a lossy coding type, the coding type of the coding mode of the media track is a lossless coding type, and the data type is a Bool type. alternative_Id, quality_ranking, and lossless_flag are represented by O correspondingly, and the fields are all optional fields.

For example, when the transport protocol is the DASH protocol, fields on the alternative relationship indication information and the alternative attribute information added to the DASH protocol are as shown in Table 3:

TABLE 3

| Syntax | Values | No. of bits | Mnemonic |
|---|---|---|---|
| Application ( ){ | | | |
|   *message_id* | | 16 | |
|   *version* | | 8 | |
|   *length* | | 16 | |
|   application_identifier( ) | | | uimsbf |
|   if (application_identifier == "urn:mpeg:mmt:app:vpcc:2019") | | | |

TABLE 3-continued

| Syntax | Values | No. of bits | Mnemonic |
|---|---|---|---|
|     { | | 8 | |
|     app_message_type | | | |
|     if (app_message_type == 0x01) { | | | |
|       *num_vpcc_asset_groups* | N1 | 8 | |
|       for (i=0; i<N1; i++) { | | | |
|         *asset_group_id* | | 16 | |
|       *alternative_content_flag* | | | |

TABLE 3-continued

| Syntax | Values | No. of bits | Mnemonic |
|---|---|---|---|
| if( *alternative_content_flag* ) { | | | |
|   *alternative_group_id* | | 16 | |
|   *alternative_type* | | 8 | |
| if(alternative_type&& 00000001){ | | | |
|   *quality_ranking* | | 8 | |
| } | | | |
| if(alternative_type&& 00000010){ | | | |
|   *lossless_flag* | | 1 | |
|   *reserved* | | 7 | |
| } | | | |
| if(alternative_type&& 00000100){ | | | |
|   *bitrate* | | 32 | |
| } | | | |
| if(alternative_type&& 00001000){ | | | |
|   *frame_rate* | | 8 | |
| } | | | |
| if(alternative_type&& 00010000){ | | | |
|   *codec_type* | | 32 | |
| } | | | |
| if(alternative_type&& 00100000){ | | | |
|   *is_tile_based* | | 1 | |
|   *reserved* | | 7 | |
| } | | | |
| *num_assets* | N2 | 16 | |
|   *start_time* | | | |
| *pending_flag* | | 32 | |
| for (j=0; j<N2; j++) { | | 8 | |
|   *data_type* | | | |
|   *reserved* | "1 | 4 | |
|   *is_pcm* | | | |

TABLE 3-continued

| Syntax | Values | No. of bits | Mnemonic |
|---|---|---|---|
| is_single_layer | | 1 | |
| state_flag | | 1 | |
| sending_time_flag | | 1 | |
| alternate_asset_flag | | 1 | |
| if(sending_time_flag){ | | 1 | |
| sending_time | | | |
| } | | 32 | |
| if(alternate_asset_flag) { | | | |
| alternate_group_id | | | |
| alternative_type | | 16 | |
| if(alternative_type&& 00000001){ | | 8 | |
| quality_ranking | | | |
| } | | 8 | |
| if(alternative_type&& 00000010){ | | | |
| lossless_flag | | | |
| reserved | | 1 | |
| } | | 7 | |
| if(alternative_type&& 00000100){ | | | |
| bitrate | | | |
| } | | 32 | |
| if(alternative_type&& 00001000){ | | | |
| frame_rate | | | |
| } | | 8 | |
| if(alternative_type&& 00010000){ | | | |
| codec_type | | | |
| } | | 32 | |
| } | | | |
| asset_id | | | |
| } | | var | |
| } | | | | where in Table 3, alternative_content_flag indicates the alternative level field, if the value of the field is 1, the corresponding media resource group (namely, playout group) and other media resource groups form an alternative relationship, and the alternative level between the media resource group and other resource groups is the media content level. If the value of the field is 0, the corresponding media resource group does not form an alternative relationship with any media resource group. alternative_asset_flag is an alternative flag. If the value of the field is 1, the media tracks in the corresponding media resource group form an alternative relationship with the media tracks in other groups. If the value of the field is 0, there are no alternative media tracks in the corresponding media resource group. alternative_type represents a difference attribute type of an alternative media resource (media track), and the track may have one or more difference attributes according to the value of the difference type. quality_ranking represents quality ranking information of a media resource, and as the value of the field is smaller, the quality of the corresponding media resource is higher. lossless_flag represents a coding type of a coding mode of a media resource, if the value of the field is 0, the coding type of the coding mode of the corresponding media resource is a lossy coding type, and if the value of the field is 1, the coding type of the coding mode of the corresponding media resource is a lossless coding type. Bitrate represents bit rate information, and indicates a bit rate of the corresponding media resource. Framerate represents frame rate information, and indicates a frame rate of the corresponding media resource. codec_type represents a coding mode, and indicates the coding mode of the corresponding media resource. is_tile_based represents a structure organization field of the media resource, if the value of the field is 1, the media resource in the media resource group has a tile structure organization, and if the value of the field is 0, the media resource in the media resource group does not have a tile structure.

S102: Transmit the alternative relationship indication information and the alternative attribute information to a playout terminal, so as to instruct the playout terminal to identify a target playout group matching with the playout terminal from the at least two playout groups according to the alternative relationship indication information and the alternative attribute information, and to decode the target playout group to obtain the volumetric media.

In this disclosure, the service device may encapsulate the at least two playout groups, the alternative relationship indication information, and the alternative attribute information to obtain a media resource file, and transmit the media resource file to the playout terminal. The playout terminal may de-encapsulate the media resource file to obtain the at least two playout groups, the alternative relationship indication information, and the alternative attribute information. In one embodiment, the playout terminal may select a target playout group adapted to the processing capacity of the playout terminal from the at least two playout groups according to the alternative relationship indication information and the alternative attribute information, and decode the target playout group to obtain the volumetric media. In one embodiment, the playout terminal may select a target playout group matching with the user demand from the at least two playout groups according to the alternative relationship indication information and the alternative attribute information, and decode the target playout group to obtain the volumetric media.

In this disclosure, the service device may obtain alternative relationship indication information and alternative attribute information between every two playout groups in the at least two playout groups of the volumetric media, and transmit the alternative relationship indication information, the alternative attribute information, and the at least two playout groups to the playout terminal. The alternative relationship indication information is used for indicating a media track pair having an alternative relationship in every two playout groups, and the alternative attribute information is used for reflecting an attribute difference between media tracks in the media track pair. That is to say, the playout quality of each playout group is known based on the alternative relationship indication information and the alternative attribute information. By transmitting the alternative relationship indication information and the alternative attribute information to the playout terminal, it is beneficial for the playout terminal to adaptively select a playout group for decoding according to a processing capacity of the playout terminal or user requirements, so as to reconstruct and present volumetric media, and realize personalized presentation. In addition, decoding of all media tracks is not required, thereby saving processing resources of the playout terminal.

Figure 9:
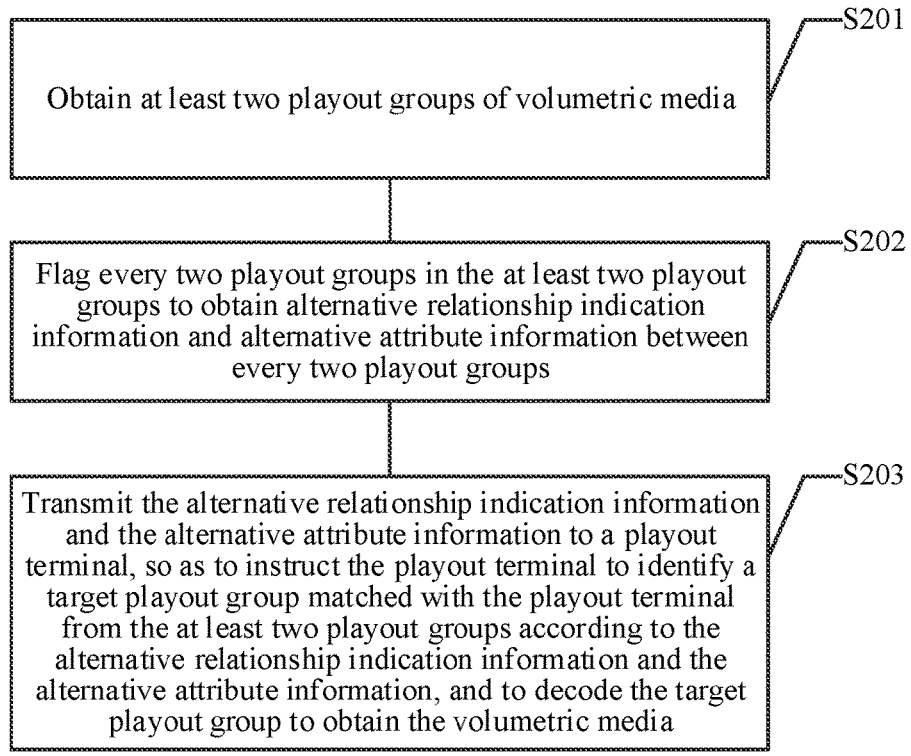
FIG. 9 is a schematic flowchart of a data processing method for volumetric media according to an embodiment of this disclosure.

Further, FIG. 9 is a schematic flowchart of a data processing method for volumetric media according to an embodiment of this disclosure. As shown in FIG. 9, the method may be performed by a service device in FIG. 1. The method may at least include the following S201-S203:

S201: Obtain at least two playout groups of volumetric media.

In an exemplary implementation, Step S201 may include the following steps s11-s12:

s11: Obtaining at least two media tracks of the volumetric media, and a track category of each media track in the at least two media tracks.

s12: Divide the at least two media tracks according to the track category of each media track to obtain at least two playout groups. The media tracks in each playout group in the at least two playout groups have a joint playout relationship, and the track categories of the media tracks in each playout group are different.

In step s11 to step s12, the service device may obtain at least two media tracks of the volumetric media and track categories of each media track, and divide the media tracks with different track categories into the same playout group according to the track categories of each media track to obtain the at least two playout groups.

S202: Flag every two playout groups in the at least two playout groups to obtain alternative relationship indication information and alternative attribute information between every two playout groups. The alternative relationship indication information is used for indicating a media track pair having an alternative relationship in every two playout groups, and the alternative attribute information is used for reflecting an attribute difference between media tracks in the media track pair having the alternative relationship.

In this disclosure, the service device may flag a media track pair having an alternative relationship in every two playout groups in the at least two playout groups to obtain alternative relationship indication information between every two playout groups, and obtain an attribute difference between attribute information of the media tracks in the media track pair to obtain alternative attribute information between every two playout groups. By flagging the alternative relationship indication information and the alternative attribute information between every two playout groups, it is beneficial for the playout terminal to dynamically and adaptively select a playout group for decoding according to a processing capacity of the playout terminal or user requirements, so as to reconstruct and present volumetric media, and realize personalized presentation.

In an exemplary implementation, Step S202 may include the following steps s21-s26:

s21: Determine a candidate media track pair according to the track categories of the media tracks in a playout group $P_m$ and the track categories of the media tracks in a playout group $P_m$ The media tracks in the candidate media track pair have the same track category, m and n are both positive integers less than Z, and Z is a quantity of groups of the at least two playout groups.

s22: Obtain attribute information of the media tracks in the candidate media track pair.

s23: Perform difference identification on the attribute information of the media tracks in the candidate media track pair to obtain a difference identification result.

s24: Take the candidate media track pair as the media track pair having the alternative relationship, and generate an alternative identifier of the media track pair in response to the difference identification result indicating that the attribute information of the media tracks in the candidate media track pair is different.

s25: Take the alternative identifier as the alternative relationship indication information between the playout group $P_m$ and the playout group $P_n$.

s26: Take the attribute information of the media tracks in the candidate media track pair as the alternative attribute information between the playout group $P_m$ and the playout group $P_n$.

In step s21 to step s26, the service device may identify a candidate media track pair having the same track category from the playout group $P_m$ and the playout group $P_n$, and obtain attribute information of media tracks in the candidate media track pair. Difference identification is performed on the attribute information of the media tracks in the candidate media track pair to obtain a difference identification result.

The difference identification result is used for reflecting whether the attribute information of media tracks in the candidate media track pair is different. If the attribute information of media tracks in the candidate media track pair is not different, the attribute information of media tracks in the candidate media track pair is identical. That is, the playout quality of the media tracks in the candidate media track pair is identical, and then the media tracks in the candidate media track pair do not have an alternative relationship. If the attribute information of media tracks in the candidate media track pair is different, the attribute information of media tracks in the candidate media track pair is not identical. That is, the playout quality of the media tracks in the candidate media track pair is not identical, and then the media tracks in the candidate media track pair have an alternative relationship. Further, the candidate media track pair may be taken as the media track pair having the alternative relationship, and an alternative identifier of the media track pair may be generated. Further, the alternative identifier may be taken as the alternative relationship indication information between the playout group $P_m$ and the playout group $P_n$, and the attribute information of the media tracks in the candidate media track pair may be taken as the alternative attribute information between the playout group $P_m$ and the playout group $P_n$. By flagging the alternative relationship indication information and the alternative attribute information between every two playout groups, it is beneficial for the playout terminal to dynamically and adaptively select a playout group for decoding according to a processing capacity of the playout terminal or user requirements, so as to reconstruct and present volumetric media, and realize personalized presentation.

S203: Transmit the alternative relationship indication information and the alternative attribute information to a playout terminal, so as to instruct the playout terminal to identify a target playout group matching with the playout terminal from the at least two playout groups according to the alternative relationship indication information and the alternative attribute information, and to decode the target playout group to obtain the volumetric media.

In this disclosure, the service device may encapsulate the at least two playout groups, the alternative relationship indication information, and the alternative attribute information to obtain a media resource file, and transmit the media resource file to the playout terminal. The playout terminal may de-encapsulate the media resource file to obtain the at least two playout groups, the alternative relationship indication information, and the alternative attribute information. Further, the playout terminal may select a target playout group matching with the playout terminal from the at least two playout groups according to the alternative relationship indication information and the alternative attribute information, and decode the target playout group to obtain the volumetric media. Decoding of all media tracks is not required by the playout terminal, thereby saving processing resources of the playout terminal.

In an exemplary implementation, the service device in step S203 may transmit the alternative relationship indication information and the alternative attribute information to the playout terminal through the data box or the transport protocol. Specifically, when the service device may transmit the alternative relationship indication information and the alternative attribute information to the playout terminal through the data box, step S203 may include steps s31-s32:

s31: Encapsulate the at least two playout groups and the alternative relationship indication information and the alternative attribute information between every two playout groups to obtain a data box of the volumetric media.

s32: Transmit the data box including the at least two playout groups, the alternative relationship indication information, and the alternative attribute information to the playout terminal.

In steps s31-s32, the service device may encapsulate the at least two playout groups, the alternative relationship indication information, and the alternative attribute information between each two playout groups according to a file format of the volumetric media (for example, ISOBMFF) to obtain a data box of the volumetric media, and transmit the data box including the at least two playout groups, the alternative relationship indication information, and the alternative attribute information to the playout terminal. That is to say, the at least two playout groups, the alternative relationship indication information, and the alternative attribute information are encapsulated into the same resource file, and the playout terminal may obtain the at least two playout groups, the alternative relationship indication information, and the alternative attribute information by downloading the resource file, which is advantageous for improving the convenience of the playout terminal in obtaining these data.

In an exemplary implementation, when the service device may transmit the alternative relationship indication information and the alternative attribute information to the playout terminal through the transport protocol, step S203 may include steps s41-s45:

s41: Obtain a transport protocol of the volumetric media.

s42: Add the alternative relationship indication information and the alternative attribute information between every two playout groups into the transport protocol.

s43: Transmit the transport protocol including the alternative relationship indication information and the alternative attribute information to the playout terminal.

s44: Receive an obtaining request for a target playout group transmitted by the playout terminal and generated according to the alternative relationship indication information and the alternative attribute information in the transport protocol, the target playout group being a playout group matching with the playout terminal in the at least two playout groups.

s45: Transmit the target playout group to the playout terminal in response to the obtaining request, so as to instruct the playout terminal to decode the target playout group to obtain the volumetric media.

In steps s41-s45, the service device may obtain a transport protocol of the volumetric media. The transport protocol includes a DASH protocol or an MMT protocol. The alternative relationship indication information and the alternative attribute information between every two playout groups are added into the transport protocol. Then, the transport protocol including the alternative relationship indication information and the alternative attribute information is transmitted to the playout terminal. The playout terminal may determine a group identifier corresponding to a target playout group matching with the playout terminal according to the alternative relationship indication information and the alternative attribute information in the transport protocol, and request a target playout group corresponding to the group identifier from the service device. That is to say, the at least two playout groups and the alternative relationship indication information are individually encapsulated in one file. In this way, all the playout groups do not need to be transmitted to the playout terminal, and network bandwidth resources can be saved.

In an exemplary implementation, step s42 may include: adding, when the transport protocol is the DASH protocol, the alternative relationship indication information and the alternative attribute information between every two playout groups into a track description field of the DASH protocol; and adding, when the transport protocol is the MMT protocol, the alternative relationship indication information and the alternative attribute information between every two playout groups into a resource group of the MMT protocol. By adding the alternative relationship indication information and the alternative attribute information to the DASH protocol or the DASH protocol, the playout terminal may predict the alternative relationship indication information and the alternative attribute information in advance, thus improving the decoding efficiency of the playout group to a certain extent and bringing better presentation effect on the volumetric media.

In this disclosure, a service device may flag a media track pair having an alternative relationship in every two playout groups of volumetric media to obtain alternative relationship indication information between every two playout groups, obtain attribute information of media tracks in the media track pair, perform difference identification on the attribute information of the media tracks in the media track pair to obtain alternative attribute information between every two playout groups, and transmit at least two playout groups, the alternative relationship indication information, and the alternative attribute information to a playout terminal. It can be seen that by transmitting the alternative relationship indication information and the alternative attribute information to the playout terminal, it is beneficial for the playout terminal to adaptively select a playout group for decoding according to a processing capacity of the playout terminal or user requirements, so as to reconstruct and present volumetric media, and realize personalized presentation. In addition, decoding of all media tracks is not required, thereby saving processing resources of the playout terminal.

Figure 10:
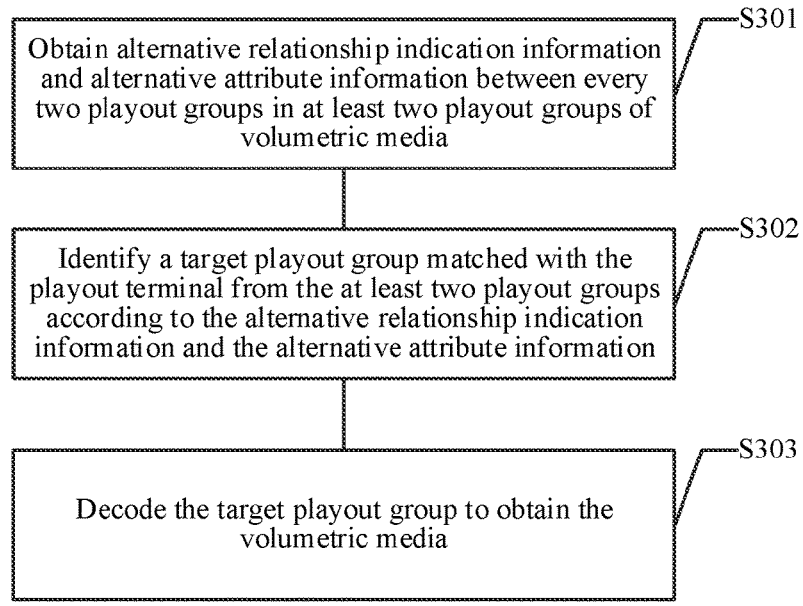
FIG. 10 is a schematic flowchart of a data processing method for volumetric media according to an embodiment of this disclosure.

Further, FIG. 10 is a schematic flowchart of a data processing method for volumetric media according to an embodiment of this disclosure. As shown in FIG. 10, the method may be performed by a playout terminal in FIG. 1. The method may at least include the following S301-S303:

S301: Obtain alternative relationship indication information and alternative attribute information between every two playout groups in at least two playout groups of volumetric media. The alternative relationship indication information is used for indicating a media track pair having an alternative relationship in every two playout groups, and the alternative attribute information is used for reflecting an attribute difference between media tracks in the media track pair having the alternative relationship.

The playout terminal may obtain alternative relationship indication information and alternative attribute information between every two playout groups in at least two playout groups of volumetric media from the service device.

S302: Identify a target playout group matching with the playout terminal from the at least two playout groups according to the alternative relationship indication information and the alternative attribute information.

In one embodiment, the playout terminal may determine processing resources and the like consumed for processing each playout group based on the alternative relationship indication information and the alternative attribute information. Then, the playout terminal may select a target playout group matching with the processing capacity of the playout terminal from the at least two playout groups according to the processing resources consumed for processing each playout group. In one embodiment, the playout quality of each playout group may be determined based on the alternative relationship indication information and the alternative attribute information, and a target playout group matching with the playout quality demands of the user may be selected from the at least two playout groups based on the playout quality of each playout group.

S303: Decode the target playout group to obtain the volumetric media.

The playout terminal may decode the target playout group to obtain the volumetric media and play the volumetric media. That is, decoding of all playout groups is not required by the playout terminal, thereby saving processing resources of the playout terminal.

Figure 11:
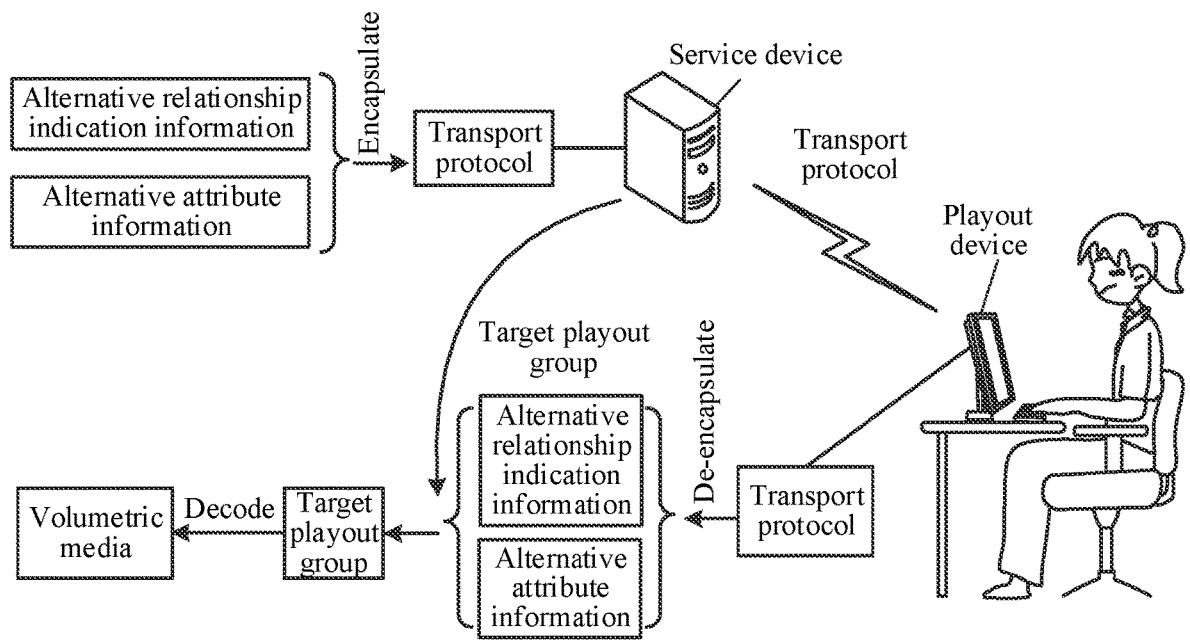
FIG. 11 is a schematic diagram of a scene in which alternative relationship indication information and alternative attribute information are obtained according to an embodiment of this disclosure.

In an exemplary implementation, as shown in FIG. 11, when the service device transmits the alternative relationship attribute information and the alternative attribute information through the transport protocol, step S302 may include: receiving the transport protocol of the volumetric media transmitted by the service device, and parsing the transport protocol to obtain the alternative relationship indication information and the alternative attribute information.

In an exemplary implementation, the operation of parsing the transport protocol to obtain the alternative relationship indication information and the alternative attribute information includes: reading, when the transport protocol is a DASH protocol, the alternative relationship indication information and the alternative attribute information in a track description field of the DASH protocol; and reading, when the transport protocol is an MMT protocol, the alternative relationship indication information and the alternative attribute information from a resource group of the MMT protocol. The playout terminal may receive the transport protocol of the volumetric media transmitted by the service device. The transport protocol may be a DASH protocol or an MMT protocol. When the transport protocol is the DASH protocol, the playout terminal may obtain the alternative relationship indication information and the alternative attribute information in a track description field of the DASH protocol. When the transport protocol is the MMT protocol, the playout terminal may read the alternative relationship indication information and the alternative attribute information from a resource group of the MMT protocol.

When the service device transmits the alternative relationship attribute information and the alternative attribute information through the transport protocol, step S303 may include steps s51-s54:

s51: Determine a group identifier of a candidate playout group matching with the playout terminal from the at least two playout groups according to the alternative relationship indication information and the alternative attribute information.

s52: Generate an obtaining request carrying the group identifier of the candidate playout group, and transmitting the obtaining request to the service device.

s53: Receive the candidate playout group returned by the service device in response to the obtaining request.

s54: Take the candidate playout group as the target playout group matching with the playout terminal.

In step s51-s54, as shown in FIG. 11, the playout terminal may determine a group identifier of a candidate playout group matching with the processing capacity of the playout terminal from the at least two playout groups according to the alternative relationship indication information and the alternative attribute information. Alternatively, the playout terminal may determine a group identifier of a candidate playout group matching with the user demands corresponding to the playout terminal from the at least two playout groups according to the alternative relationship indication information and the alternative attribute information. Then, an obtaining request carrying the group identifier of the candidate playout group may be generated, and the obtaining request may be obtained to the service device. A candidate playout group returned by the service device in response to the obtaining request is received, the candidate playout group is taken as a target playout group matching with the playout terminal. By obtaining a transport protocol carrying the alternative relationship indication information and the alternative attribute information from the service device in advance, the playout terminal may determine a target playout group matching with the playout terminal according to the alternative relationship indication information and the alternative attribute information, and only the target playout group needs to be obtained from the service device without downloading all the playout groups, thus saving network bandwidth resources.

In an exemplary implementation, step s51 may include steps s61-s63:

s61: Obtain attribute information of the playout terminal, and determining a processing performance level of the playout terminal for processing the volumetric media according to the attribute information of the playout terminal.

s62: Determine a processing difficulty level of processing each playout group in the at least two playout groups according to the alternative relationship indication information and the alternative attribute information. The processing difficulty level is determined according to a quantity of processing resources consumed for processing each playout group.

s63: Take a playout group having the processing difficulty level in the at least two playout groups matching with the processing difficulty level of the playout terminal as the candidate playout group, and obtain the group identifier of the candidate playout group.

In steps s61-s63, the playout terminal may obtain attribute information of the playout terminal, including a storage space size, a data processing speed, and the like, and determine a processing performance level (such as a decoding capacity level) of the playout terminal for processing volumetric media according to the attribute information of the playout terminal. Further, a quantity of processing resources required to be consumed for processing each playout group may be determined according to the alternative relationship indication information and the alternative attribute information, and a processing difficulty level for processing each playout group of the at least two playout groups may be generated according to the quantity of processing resources required to be consumed for processing each playout group. That is, there is a positive correlation between the quantity of processing resources consumed for processing each playout group and the processing difficulty level for processing each playout group. That is, the processing difficulty level for processing each playout group becomes higher as the quantity of processing resources consumed for processing each playout group increases and becomes lower as the quantity of processing resources consumed for processing each playout group decreases. Further, a playout group having the processing difficulty level in the at least two playout groups matching with the processing difficulty level of the playout terminal is taken as the candidate playout group, and the group identifier of the candidate playout group is obtained. According to the processing difficulty level of the playout group and the processing performance level of the playout terminal, the target playout group may be selected to realize personalized presentation. For example, if the processing performance level of the playout terminal is relatively high, a target playout group with a high processing difficulty level may be obtained from the service device. At this moment, as the playout quality of the target playout group is higher, the playout effect of the volumetric media can be improved. On the contrary, if the processing performance level of the playout terminal is relatively low, the target playout group with a low processing difficulty level may be obtained from the service device, which is advantageous for ensuring the fluency of playing the volumetric media.

Figure 12:
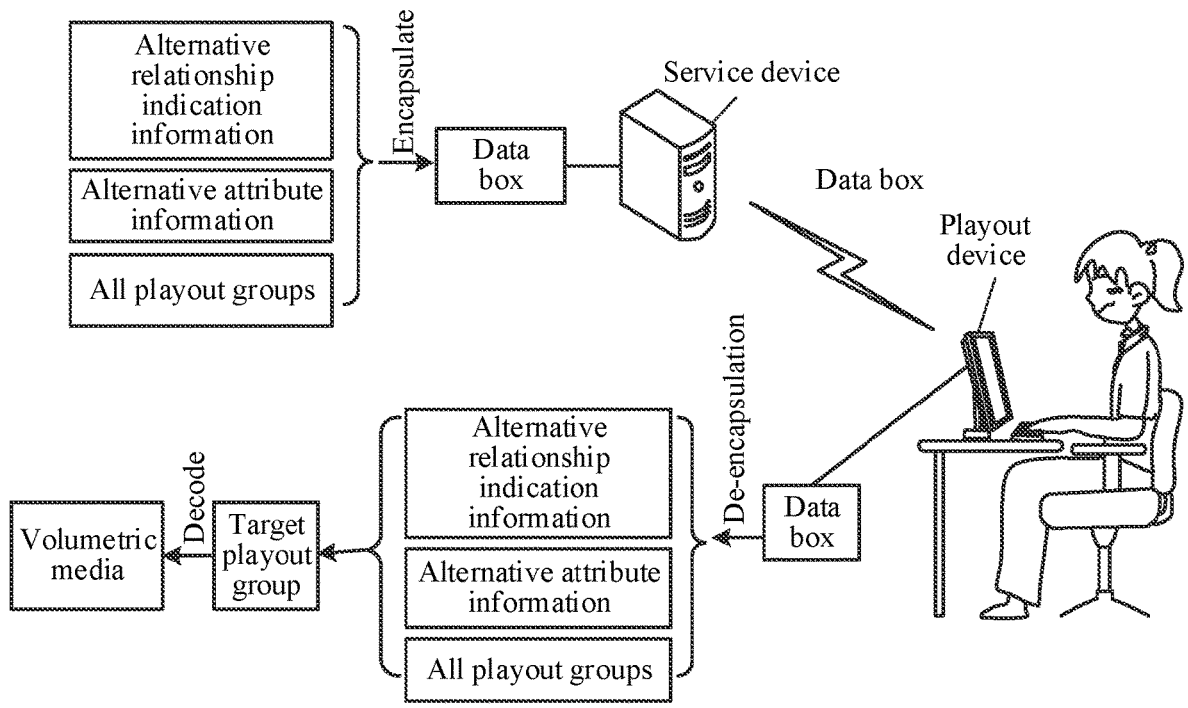
FIG. 12 is a schematic diagram of a scene in which alternative relationship indication information and alternative attribute information are obtained according to an embodiment of this disclosure.

In an exemplary implementation, as shown in FIG. 12, when the service device transmits the alternative relationship attribute information and the alternative attribute information through the data box, step S301 may include: obtaining a data box of the volumetric media from the service device, and encapsulating the data box of the volumetric media to obtain the at least two playout groups and the alternative relationship indication information and the alternative attribute information between every two playout groups in the at least two playout groups.

In an exemplary implementation, step s51 may include: obtaining a first quality ranking of the volumetric media historically played by the playout terminal; determining a second quality ranking of each playout group in the at least two playout groups according to the alternative relationship indication information and the alternative attribute information; and taking a playout group having the second quality ranking in the at least two playout groups matching with the first quality ranking as the candidate playout group, and obtaining the group identifier of the candidate playout group.

The playout terminal may select a matching target playout group according to historical playout behavior data. Specifically, a first quality ranking of the volumetric media played by the playout terminal historically (such as the latest week or the latest month) may be obtained, and a second quality ranking of each playout group in the at least two playout groups may be determined according to the alternative relationship indication information and the alternative attribute information. The second quality ranking of each playout group is determined according to the coding type of the coding mode of the media track pair. That is, the quality ranking of the playout group corresponding to the media track in which the coding type is a lossless coding type is higher than the quality ranking of the playout group corresponding to the media track in which the coding type is a lossy coding type. A playout group having the second quality ranking in the at least two playout groups identical to the first quality ranking is taken as the candidate playout group, and the group identifier of the candidate playout group is obtained. By selecting the matching target playout group according to the historical playout behavior data, it is advantageous for presenting satisfactory volumetric media for users.

In an exemplary implementation, the playout terminal may determine a second quality ranking of each playout group in the at least two playout groups according to the alternative relationship indication information and the alternative attribute information, display the second quality ranking of each playout group, and obtain a group identifier of the candidate playout group by taking the selected playout group as the candidate playout group in response to a selection operation of the playout group from the at least two playout groups according to the second quality ranking. By displaying the second quality ranking of each playout group, it is advantageous for users to select playout groups according to own preferences, and it is advantageous to realize personalized presentation of the volumetric media. When the service device transmits the alternative relationship attribute information and the alternative attribute information through the data box, the playout terminal may obtain the alternative relationship attribute information, the alternative attribute information, and the at least two playout groups through the data box. Specifically, the playout terminal may obtain a data box of the volumetric media from the service device, and encapsulate the data box of the volumetric media to obtain the at least two playout groups and the alternative relationship indication information and the alternative attribute information between every two playout groups in the at least two playout groups. The at least two playout groups, the alternative relationship indication information, and the alternative attribute information may be obtained by de-encapsulating the data box of the volumetric media, thereby improving the convenience of obtaining these information.

In an exemplary implementation, step S303 includes: decoding the target playout group to obtain a media content of the volumetric media; and performing time synchronization on the media content to obtain the volumetric media.

In an exemplary implementation, the media content of the volumetric media includes at least one of an audio content, a video content, and a text content.

The playout terminal may determine the coding mode of each media track in the target playout group from the description information of the target playout group, and determine the decoding mode of each media track according to the coding mode of each media track in the target playout group. Each media track is decoded by adopting the decoding mode of each media track to obtain the media content of the volumetric media. Time synchronization is performed on the audio content, the video content, and the text content to obtain the volumetric media. The volumetric media may be obtained only by decoding one playout group in the at least two playout groups by the playout terminal, and the decoding resources of the playout terminal can be saved without decoding all the playout groups. In this disclosure, a playout terminal selects a target playout group matching therewith from at least two playout groups dynamically and adaptively according to alternative relationship indication information and alternative attribute information, and only needs to decode the target playout group to obtain volumetric media without decoding all the playout groups, thereby saving processing resources of the playout terminal.

Figure 13:
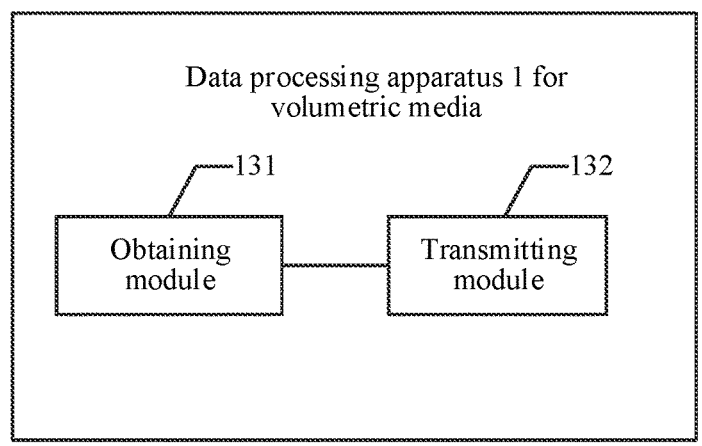
FIG. 13 is a schematic structural diagram of a data processing apparatus for volumetric media according to an embodiment of this disclosure.

FIG. 13 is a schematic structural diagram of a data processing apparatus 1 for volumetric media according to an embodiment of this disclosure. The data processing apparatus 1 for volumetric media may be a computer-readable instruction (including program code) executed in a computer device. For example, the data processing apparatus 1 for volumetric media is application software. The apparatus may be configured to perform corresponding steps in the method according to this embodiment of this disclosure. As shown in FIG. 13, the data processing apparatus 1 for volumetric media may include: an obtaining module 131 and a transmitting module 132.

The term "module" (and other similar terms such as unit, submodule, etc.) refers to computing software, firmware, hardware, and/or various combinations thereof. At a minimum, however, modules are not to be interpreted as software that is not implemented on hardware, firmware, or recorded on a non-transitory processor readable recordable storage medium. Indeed "module" is to be interpreted to include at least some physical, non-transitory hardware such as a part of a processor, circuitry, or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices. The modules can be implemented in software stored in memory or non-transitory computer-readable medium. The software stored in the memory or medium can run on a processor or circuitry (e.g., ASIC, PLA, DSP, FPGA, or any other integrated circuit) capable of executing computer instructions or computer code. The modules can also be implemented in hardware using processors or circuitry on the same or different integrated circuit.

The obtaining module is configured to obtain alternative relationship indication information and alternative attribute information between every two playout groups in at least two playout groups of volumetric media. The alternative relationship indication information is used for indicating a media track pair having an alternative relationship in every two playout groups, and the alternative attribute information is used for reflecting an attribute difference between media tracks in the media track pair having the alternative relationship.

The transmitting module is configured to transmit the alternative relationship indication information and the alternative attribute information to a playout terminal, so as to instruct the playout terminal to identify a target playout group matching with the playout terminal from the at least two playout groups according to the alternative relationship indication information and the alternative attribute information, and to decode the target playout group to obtain the volumetric media.

In an exemplary implementation, the operation of obtaining, by the obtaining module, alternative relationship indication information and alternative attribute information between every two playout groups in at least two playout groups of volumetric media includes:

obtaining a data box of the volumetric media, the data box of the volumetric media including the alternative relationship indication information and the alternative attribute information between every two playout groups.

In an exemplary implementation, the operation of obtaining, by the obtaining module, alternative relationship indication information and alternative attribute information between every two playout groups in at least two playout groups of volumetric media includes:

obtaining a transport protocol of the volumetric media, the transport protocol including the alternative relationship indication information and the alternative attribute information between every two playout groups.

In an exemplary implementation, when the transport protocol is a DASH protocol, the alternative relationship indication information and the alternative attribute information between every two playout groups are located in a track description field of the DASH protocol.

In an exemplary implementation, when the transport protocol is an MMT protocol, the alternative relationship indication information and the alternative attribute information between every two playout groups are located in a resource group of the MMT protocol.

In an exemplary implementation, the media track pair includes a first media track belonging to a playout group $P_m$ and a second media track belonging to a playout group $P_n$, alternative attribute information between the playout group $P_m$ and the playout group $P_n$ includes attribute information of the first media track and attribute information of the second media track, m and n are both positive integers less than Z, and Z is a quantity of groups of the at least two playout groups.

The attribute information of the first media track includes a coding mode of the first media track, the attribute information of the second media track includes a coding mode of the second media track, and the coding mode of the first media track is different from the coding mode of the second media track.

In an exemplary implementation, the attribute information of the first media track further includes at least one of a transmission rate, a structure organization, a quality ranking, and a coding type corresponding to the coding mode of the first media track.

The attribute information of the second media track further includes at least one of a transmission rate, a structure organization, a quality ranking, and a coding type corresponding to the coding mode of the second media track.

In an exemplary implementation, the alternative relationship indication information further includes an alternative level field. When the alternative level field in the alternative relationship indication information between the playout group $P_m$ and the playout group $P_n$ is a first value, the alternative level field is used for reflecting that an alternative level between the playout group $P_m$ and the playout group $P_n$ is a media content level.

In an exemplary implementation, the alternative relationship indication information further includes an alternative level field. When the alternative level field in the alternative relationship indication information between the playout group $P_m$ and the playout group $P_n$ is a second value, the alternative level field is used for reflecting that an alternative level between the playout group $P_m$ and the playout group $P_n$ is a track level.

In an exemplary implementation, when the alternative level between the playout group $P_m$ and the playout group $P_n$ is the media content level, a quantity of the media track pair having the alternative relationship in the playout group $P_m$ and the playout group $P_n$ is R, R is a quantity of media tracks in the playout group $P_m$, and the quantity of media tracks in the playout group $P_m$ is the same as a quantity of tracks in the playout group $P_n$.

In an exemplary implementation, when the alternative level between the playout group $P_m$ and the playout group $P_n$ is the track level, a quantity of the media track pair having the alternative relationship in the playout group $P_m$ and the playout group $P_n$ is a positive integer less than R.

In an exemplary implementation, when the alternative level between the playout group $P_m$ and the playout group $P_n$ is the media content level, coding modes of the media tracks in the playout group $P_m$ are a first coding mode. Coding modes of the media tracks in the playout group $P_n$ are a second coding mode.

In an exemplary implementation, the media tracks in each playout group in the at least two playout groups have a joint playout relationship, and the track categories of the media tracks in each playout group are different.

The track categories of the media tracks in the media track pair having the alternative relationship in every two playout groups are identical.

In an exemplary implementation, the alternative relationship indication information includes an alternative identifier of the media track pair having the alternative relationship in every two playout groups.

According to one embodiment of this disclosure, the steps involved in the data processing method for volumetric media shown in FIG. 6 may be performed by the various modules in the data processing apparatus for volumetric media shown in FIG. 13. For example, step S101 shown in FIG. 6 may be performed by the obtaining module 131 in FIG. 13, and step S102 shown in FIG. 6 may be performed by the transmitting module 132 in FIG. 13.

According to one embodiment of this disclosure, various modules in the data processing apparatus for volumetric media shown in FIG. 13 may be respectively or completely combined into one or more units to constitute the apparatus, or some unit(s) therein may be further divided into multiple functionally smaller subunits, and the same operation may be realized without affecting the achievement of the technical effects of this embodiment of this disclosure. The modules are divided based on logical functions. In practice, the functions of one module may also be realized by multiple units, or the functions of multiple modules may be realized by one unit. In other embodiments of this disclosure, the data processing apparatus for volumetric media may further include other units. In practice, the functions may also be realized with the aid of other units, and may be realized in cooperation by multiple units.

According to one embodiment of this disclosure, the data processing apparatus for volumetric media shown in FIG. 13 may be constructed and the data processing method for volumetric media according to this embodiment of this disclosure may be implemented by executing computer-readable instructions (including program code) that can perform the steps of the corresponding method shown in FIG. 6 on processing elements and storage elements including a central processing unit (CPU), a random access memory (RAM), a read-only memory (ROM), and so on, for example, general computer devices of computers. The computer-readable instructions may be recorded in, for example, a computer-readable recording medium, may be loaded into the computing device by using the computer-readable recording medium, and may be executed in the computing device.

In this disclosure, a service device may flag a media track pair having an alternative relationship in every two playout groups of volumetric media to obtain alternative relationship indication information between every two playout groups, obtain attribute information of media tracks in the media track pair, perform difference identification on the attribute information of the media tracks in the media track pair to obtain alternative attribute information between every two playout groups, and transmit at least two playout groups, the alternative relationship indication information, and the alternative attribute information to a playout terminal. It can be seen that by transmitting the alternative relationship indication information and the alternative attribute information to the playout terminal, it is beneficial for the playout terminal to adaptively select a playout group for decoding according to a processing capacity of the playout terminal or user requirements, so as to reconstruct and present volumetric media, and realize personalized presentation. In addition, decoding of all media tracks is not required, thereby saving processing resources of the playout terminal.

Figure 14:
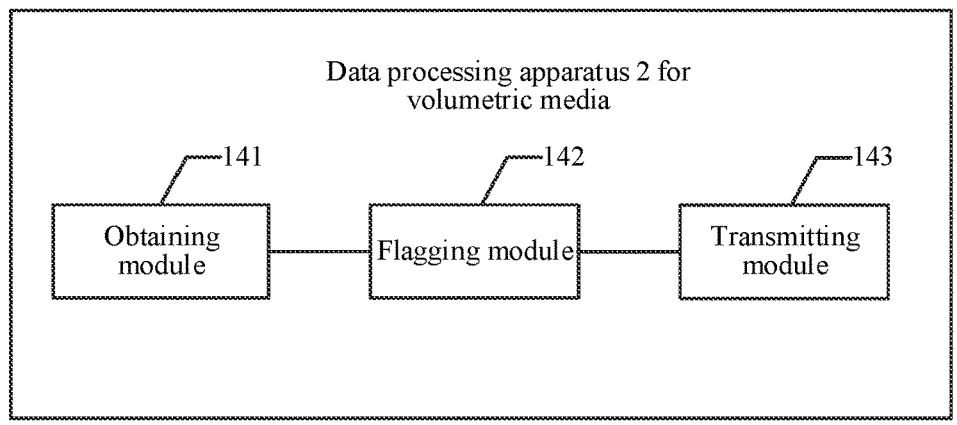
FIG. 14 is a schematic structural diagram of a data processing apparatus for volumetric media according to an embodiment of this disclosure.

FIG. 14 is a schematic structural diagram of a data processing apparatus 2 for volumetric media according to an embodiment of this disclosure. The data processing apparatus 2 for volumetric media may be a computer-readable instruction (including program code) executed in a computer device. For example, the data processing apparatus 2 for volumetric media is application software. The apparatus may be configured to perform corresponding steps in the method according to this embodiment of this disclosure. As shown in FIG. 14, the data processing apparatus 2 for volumetric media may include: an obtaining module 141, a flagging module 142, and a transmitting module 143.

The obtaining module is configured to obtain at least two playout groups of volumetric media.

The flagging module is configured to flag every two playout groups in the at least two playout groups to obtain alternative relationship indication information and alternative attribute information between every two playout groups. The alternative relationship indication information is used for indicating a media track pair having an alternative relationship in every two playout groups, and the alternative attribute information is used for reflecting an attribute difference between media tracks in the media track pair having the alternative relationship.

The transmitting module is configured to transmit the alternative relationship indication information and the alternative attribute information to a playout terminal, so as to instruct the playout terminal to identify a target playout group matching with the playout terminal from the at least two playout groups according to the alternative relationship indication information and the alternative attribute information, and to decode the target playout group to obtain the volumetric media.

In an exemplary implementation, the operation of obtaining, by the obtaining module, at least two playout groups of volumetric media includes:
    obtaining at least two media tracks of the volumetric media, and a track category of each media track in the at least two media tracks; and
    dividing the at least two media tracks according to the track category of each media track to obtain at least two playout groups, the media tracks in each playout group in the at least two playout groups having a joint playout relationship, and the track categories of the media tracks in each playout group being different.

In an exemplary implementation, the operation of flagging, by the flagging module, every two playout groups in the at least two playout groups to obtain alternative relationship indication information and alternative attribute information between every two playout groups includes:
    determining a candidate media track pair according to the track categories of the media tracks in a playout group $P_m$ and the track categories of the media tracks in a playout group $P_n$, the media tracks in the candidate media track pair having the same track category, m and n being both positive integers less than Z, and Z being a quantity of groups of the at least two playout groups;
    obtaining attribute information of the media tracks in the candidate media track pair;
    performing difference identification on the attribute information of the media tracks in the candidate media track pair to obtain a difference identification result;

taking the candidate media track pair as the media track pair having the alternative relationship, and generating an alternative identifier of the media track pair in response to the difference identification result indicating that the attribute information of the media tracks in the candidate media track pair is different;

taking the alternative identifier as the alternative relationship indication information between the playout group $P_m$ and the playout group $P_n$, and taking the attribute information of the media tracks in the candidate media track pair as the alternative attribute information between the playout group $P_m$ and the playout group $P_n$.

In an exemplary implementation, the operation of transmitting, by the transmitting module, the alternative relationship indication information and the alternative attribute information to a playout terminal, so as to instruct the playout terminal to identify a target playout group matching with the playout terminal from the at least two playout groups according to the alternative relationship indication information and the alternative attribute information, and to decode the target playout group to obtain the volumetric media includes:

encapsulating the at least two playout groups and the alternative relationship indication information and the alternative attribute information between every two playout groups to obtain a data box of the volumetric media; and transmitting the data box including the at least two playout groups, the alternative relationship indication information, and the alternative attribute information to the playout terminal, so as to instruct the playout terminal to identify a target playout group matching with the playout terminal from the at least two playout groups according to the alternative relationship indication information and the alternative attribute information, and to decode the target playout group to obtain the volumetric media.

In an exemplary implementation, the operation of transmitting, by the transmitting module, the alternative relationship indication information and the alternative attribute information to a playout terminal, so as to instruct the playout terminal to identify a target playout group matching with the playout terminal from the at least two playout groups according to the alternative relationship indication information and the alternative attribute information, and to decode the target playout group to obtain the volumetric media includes:

obtaining a transport protocol of the volumetric media;

adding the alternative relationship indication information and the alternative attribute information between every two playout groups into the transport protocol;

transmitting the transport protocol including the alternative relationship indication information and the alternative attribute information to the playout terminal;

receiving an obtaining request for a target playout group transmitted by the playout terminal and generated according to the alternative relationship indication information and the alternative attribute information in the transport protocol, the target playout group being a playout group matching with the playout terminal in the at least two playout groups; and transmitting the target playout group to the playout terminal in response to the obtaining request, so as to instruct the playout terminal to decode the target playout group to obtain the volumetric media.

In an exemplary implementation, the operation of adding, by the transmitting module, the alternative relationship indication information and the alternative attribute information between every two playout groups into the transport protocol includes:

adding, when the transport protocol is a dynamic adaptive streaming over HTTP (DASH) protocol, the alternative relationship indication information and the alternative attribute information between every two playout groups into a track description field of the DASH protocol.

In an exemplary implementation, the operation of adding, by the transmitting module, the alternative relationship indication information and the alternative attribute information between every two playout groups into the transport protocol includes:

adding, when the transport protocol is a moving picture experts group media transport (MMT) protocol, the alternative relationship indication information and the alternative attribute information between every two playout groups into a resource group of the MMT protocol.

According to one embodiment of this disclosure, the steps involved in the data processing method for volumetric media shown in FIG. 9 may be performed by the various modules in the data processing apparatus for volumetric media shown in FIG. 14. For example, step S201 shown in FIG. 9 may be performed by the obtaining module 141 in FIG. 14, and step S202 shown in FIG. 9 may be performed by the flagging module 142 in FIG. 14. Step S203 shown in FIG. 9 may be performed by the transmitting module 143 in FIG. 14.

According to one embodiment of this disclosure, various modules in the data processing apparatus 2 for volumetric media shown in FIG. 14 may be respectively or completely combined into one or more units to constitute the apparatus, or some unit(s) therein may be further divided into multiple functionally smaller subunits, and the same operation may be realized without affecting the achievement of the technical effects of this embodiment of this disclosure. The modules are divided based on logical functions. In practice, the functions of one module may also be realized by multiple units, or the functions of multiple modules may be realized by one unit. In other embodiments of this disclosure, the data processing apparatus for volumetric media may further include other units. In practice, the functions may also be realized with the aid of other units, and may be realized in cooperation by multiple units.

According to one embodiment of this disclosure, the data processing apparatus for volumetric media shown in FIG. 14 may be constructed and the data processing method for volumetric media according to this embodiment of this disclosure may be implemented by executing computer-readable instructions (including program code) that can perform the steps of the corresponding method shown in FIG. 9 on processing elements and storage elements including a central processing unit (CPU), a random access memory (RAM), a read-only memory (ROM), and so on, for example, general computer devices of computers. The computer-readable instructions may be recorded in, for example, a computer-readable recording medium, may be loaded into the computing device by using the computer-readable recording medium, and may be executed in the computing device.

In this disclosure, a service device may flag a media track pair having an alternative relationship in every two playout groups of volumetric media to obtain alternative relationship indication information between every two playout groups, obtain attribute information of media tracks in the media track pair, perform difference identification on the attribute information of the media tracks in the media track pair to obtain alternative attribute information between every two playout groups, and transmit at least two playout groups, the alternative relationship indication information, and the alternative attribute information to a playout terminal. It can be seen that by transmitting the alternative relationship indication information and the alternative attribute information to the playout terminal, it is beneficial for the playout terminal to adaptively select a playout group for decoding according to a processing capacity of the playout terminal or user requirements, so as to reconstruct and present volumetric media, and realize personalized presentation. In addition, decoding of all media tracks is not required, thereby saving processing resources of the playout terminal.

Figure 15:
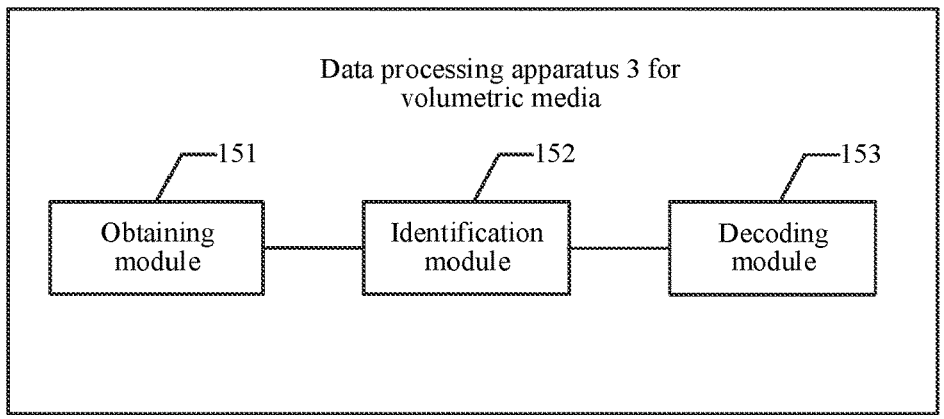
FIG. 15 is a schematic structural diagram of a data processing apparatus for volumetric media according to an embodiment of this disclosure.

FIG. 15 is a schematic structural diagram of a data processing apparatus 3 for volumetric media according to an embodiment of this disclosure. The data processing apparatus 3 for volumetric media may be a computer-readable instruction (including program code) executed in a computer device. For example, the data processing apparatus 3 for volumetric media is application software. The apparatus may be configured to perform corresponding steps in the method according to this embodiment of this disclosure. As shown in FIG. 15, the data processing apparatus 3 for volumetric media may include: an obtaining module 151, an identification module 152, and a decoding module 153.

The obtaining module is configured to obtain alternative relationship indication information and alternative attribute information between every two playout groups in at least two playout groups of volumetric media. The alternative relationship indication information is used for indicating a media track pair having an alternative relationship in every two playout groups, and the alternative attribute information is used for reflecting an attribute difference between media tracks in the media track pair having the alternative relationship.

The identification module is configured to identify a target playout group matching with the playout terminal from the at least two playout groups according to the alternative relationship indication information and the alternative attribute information.

The decoding module is configured to decode the target playout group to obtain the volumetric media.

In an exemplary implementation, the operation of obtaining, by the obtaining module, alternative relationship indication information and alternative attribute information between every two playout groups in at least two playout groups of volumetric media includes:
  receiving a transport protocol of the volumetric media transmitted by a service device; and
  parsing the transport protocol to obtain the alternative relationship indication information and the alternative attribute information.

In an exemplary implementation, the operation of identifying, by the identification module, a target playout group matching with the playout terminal from the at least two playout groups according to the alternative relationship indication information and the alternative attribute information includes:
  determining a group identifier of a candidate playout group matching with the playout terminal from the at least two playout groups according to the alternative relationship indication information and the alternative attribute information;
  generating an obtaining request carrying the group identifier of the candidate playout group, and transmitting the obtaining request to the service device;
  receiving the candidate playout group returned by the service device in response to the obtaining request; and
  taking the candidate playout group as the target playout group matching with the playout terminal.

In an exemplary implementation, the operation of determining, by the identification module, a group identifier of a candidate playout group matching with the playout terminal from the at least two playout groups according to the alternative relationship indication information and the alternative attribute information includes:
  obtaining attribute information of the playout terminal, and determining a processing performance level of the playout terminal for processing the volumetric media according to the attribute information of the playout terminal;
  determining a processing difficulty level of processing each playout group in the at least two playout groups according to the alternative relationship indication information and the alternative attribute information, the processing difficulty level being determined according to a quantity of processing resources consumed for processing each playout group; and
  taking a playout group having the processing difficulty level in the at least two playout groups matching with the processing difficulty level of the playout terminal as the candidate playout group, and obtaining the group identifier of the candidate playout group.

In an exemplary implementation, the operation of determining, by the identification module, a group identifier of a candidate playout group matching with the playout terminal from the at least two playout groups according to the alternative relationship indication information and the alternative attribute information includes:
  obtaining a first quality ranking of the volumetric media historically played by the playout terminal;
  determining a second quality ranking of each playout group in the at least two playout groups according to the alternative relationship indication information and the alternative attribute information; and
  taking a playout group having the second quality ranking in the at least two playout groups matching with the first quality ranking as the candidate playout group, and obtaining the group identifier of the candidate playout group.

In an exemplary implementation, the operation of parsing, by the obtaining module, the transport protocol to obtain the alternative relationship indication information and the alternative attribute information includes:
  reading, when the transport protocol is a dynamic adaptive streaming over HTTP (DASH) protocol, the alternative relationship indication information and the alternative attribute information in a track description field of the DASH protocol.

In an exemplary implementation, the operation of parsing, by the obtaining module, the transport protocol to obtain the alternative relationship indication information and the alternative attribute information includes:
  reading, when the transport protocol is an MMT protocol, the alternative relationship indication information and the alternative attribute information from a resource group of the MMT protocol.

In an exemplary implementation, the operation of obtaining, by the obtaining module, alternative relationship indication information and alternative attribute information between every two playout groups in at least two playout groups of volumetric media includes:

obtaining a data box of the volumetric media from the service device; and encapsulating the data box of the volumetric media to obtain the at least two playout groups and the alternative relationship indication information and the alternative attribute information between every two playout groups in the at least two playout groups.

In an exemplary implementation, the operation of decoding, by the decoding module, the target playout group to obtain the volumetric media and playing the volumetric media includes:

decoding the target playout group to obtain a media content of the volumetric media; and performing time synchronization on the media content to obtain the volumetric media, and playing the volumetric media.

In an exemplary implementation, the media content of the volumetric media includes at least one of an audio content, a video content, and a text content.

According to one embodiment of this disclosure, the steps involved in the data processing method for volumetric media shown in FIG. 10 may be performed by the various modules in the data processing apparatus for volumetric media shown in FIG. 15. For example, step S301 shown in FIG. 10 may be performed by the obtaining module 151 in FIG. 15, and step S302 shown in FIG. 10 may be performed by the identification module 152 in FIG. 15. Step S303 shown in FIG. 10 may be performed by the decoding module 153 in FIG. 15.

According to one embodiment of this disclosure, various modules in the data processing apparatus 3 for volumetric media shown in FIG. 15 may be respectively or completely combined into one or more units to constitute the apparatus, or some unit(s) therein may be further divided into a plurality of functionally smaller subunits, and the same operation may be realized without affecting the achievement of the technical effects of this embodiment of this disclosure. The modules are divided based on logical functions. In practice, the functions of one module may also be realized by multiple units, or the functions of multiple modules may be realized by one unit. In other embodiments of this disclosure, the data processing apparatus for volumetric media may further include other units. In practice, the functions may also be realized with the aid of other units, and may be realized in cooperation by multiple units.

According to one embodiment of this disclosure, the data processing apparatus for volumetric media shown in FIG. 15 may be constructed and the data processing method for volumetric media according to this embodiment of this disclosure may be implemented by executing computer-readable instructions (including program code) that can perform the steps of the corresponding method shown in FIG. 10 on processing elements and storage elements including a CPU, a RAM, a ROM, and so on, for example, general computer devices of computers. The computer-readable instructions may be recorded in, for example, a computer-readable recording medium, may be loaded into the computing device by using the computer-readable recording medium, and may be executed in the computing device.

In this disclosure, a playout terminal selects a target playout group matching therewith from at least two playout groups dynamically and adaptively according to alternative relationship indication information and alternative attribute information, and only needs to decode the target playout group to obtain volumetric media without decoding all the playout groups, thereby saving processing resources of the playout terminal.

Figure 16:
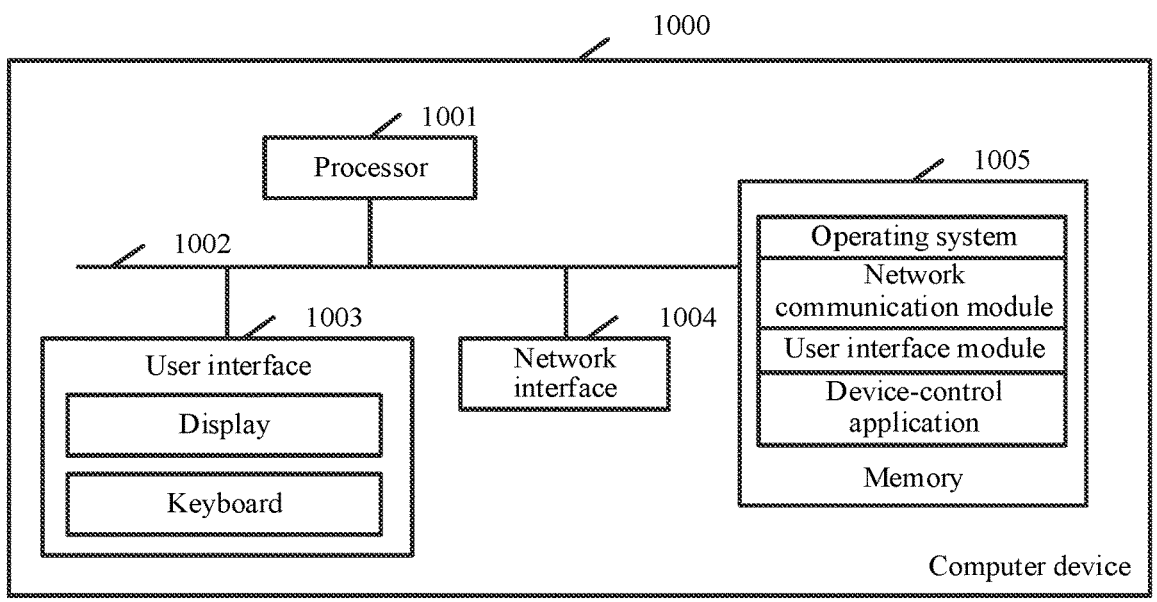
FIG. 16 is a schematic structural diagram of a computer device according to an embodiment of this disclosure.

FIG. 16 is a schematic structural diagram of a computer device according to an embodiment of this disclosure. As shown in FIG. 16, the computer device 1000 may include: a processor 1001, a network interface 1004, and a memory 1005. In addition, the computer device 1000 may further include: a user interface 1003 and at least one communication bus 1002. The communication bus 1002 is configured to implement connection and communication between the components. The user interface 1003 may include a display and a keyboard. In an exemplary implementation, the user interface 1003 may further include a standard wired interface and a standard wireless interface. In an exemplary implementation, the network interface 1004 may include a standard wired interface and wireless interface (such as a WI-FI interface). The memory 1005 may be a high-speed random access memory (RAM), or may be a non-volatile memory, for example, at least one magnetic disk storage. In an exemplary implementation, the memory 1005 may be at least one storage apparatus that is located far away from the foregoing processor 1001. As shown in FIG. 16, the memory 1005 used as one or more computer-readable storage media may include an operating system, a network communication module, a user interface module, and a device-control application.

In the computer device 1000 shown in FIG. 16, the network interface 1004 may provide a network communication function. The user interface 1003 is mainly used as an interface enabling input by a user. The processor 1001 may be configured to call the device-control application stored in the memory 1005 to implement the steps of the method according to the various embodiments of this disclosure.

It is to be understood that the computer device 1000 described in this embodiment of this disclosure may perform the description of the data processing method for volumetric media in the embodiments corresponding to FIG. 6, FIG. 9, and FIG. 10, as well as the description of the data processing apparatus for volumetric media in the embodiments corresponding to FIG. 13 to FIG. 15.

Furthermore, this embodiment of this disclosure also provides one or more computer-readable storage media. Computer-readable instructions executed by the aforementioned data processing apparatus for volumetric media are stored in the computer-readable storage medium. The computer-readable instructions include program instructions. When the processor executes the program instructions, the description of the data processing method for volumetric media in the embodiment corresponding to FIG. 6, FIG. 9, and FIG. 10 can be performed. Therefore, no description will be repeated herein. For technical details that are not disclosed in the computer-readable storage medium embodiment involved in this disclosure, reference is made to the description of the method embodiment of this disclosure.

As an example, the program instructions may be deployed to be executed on one computer device, or on multiple computer devices located at one site, or on multiple computer devices distributed across multiple sites and interconnected by a communication network. The multiple computer devices distributed across the plurality of sites and interconnected by the communication network may form a blockchain network.

This embodiment of this disclosure also provides a computer program product, including computer-readable instructions. When the computer-readable instructions are executed by one or more processors, the steps of the method in the various embodiments of this disclosure are implemented.

A person of ordinary skill in the art may understand that all or some procedures in the methods in the foregoing embodiments may be implemented by computer-readable instructions instructing relevant hardware. The program may be stored in a computer-readable storage medium. When the program is executed, the procedures of the foregoing method embodiments may be implemented. The storage medium may be a magnetic disc, an optical disc, a ROM, or a RAM, or the like.

What is disclosed above is merely exemplary embodiments of this disclosure, and certainly is not intended to limit the scope of the claims of this disclosure. Therefore, equivalent variations made in accordance with the claims of this disclosure shall fall within the scope of this disclosure.

What is claimed is:

1. A data processing method for volumetric media, performed by a service device, the method comprising:
   obtaining alternative relationship indication information and alternative attribute information between every two playout groups in at least two playout groups of volumetric media, the alternative relationship indication information being for indicating a media track pair having an alternative relationship in every two playout groups, the every two playout groups comprising a first playout group and a second playout group, the media track pair comprising a first media track and a second media track having the alternative relationship, the first media track being included in the first playout group, the second media track being included in the second playout group, and the alternative attribute information being for reflecting an attribute difference between media tracks in the media track pair having the alternative relationship; and
   transmitting the alternative relationship indication information and the alternative attribute information to a playout terminal, so as to instruct the playout terminal to identify a target playout group matching with the playout terminal from the at least two playout groups according to the alternative relationship indication information and the alternative attribute information, and to decode the target playout group to obtain the volumetric media.

2. The method according to claim 1, wherein the obtaining the alternative relationship indication information and the alternative attribute information comprises:
   obtaining a data box of the volumetric media, the data box of the volumetric media comprising the alternative relationship indication information and the alternative attribute information between the every two playout groups.

3. The method according to claim 1, wherein the media track pair comprises a first media track belonging to a playout group Pm and a second media track belonging to a playout group $P_n$, alternative attribute information between the playout group $P_m$ and the playout group $P_n$ comprises attribute information of the first media track and attribute information of the second media track, m and n are both positive integers less than Z, and Z is a quantity of groups of the at least two playout groups; wherein the attribute information of the first media track comprises a coding mode of the first media track, the attribute information of the second media track comprises a coding mode of the second media track, and the coding mode of the first media track is different from the coding mode of the second media track.

4. The method according to claim 3, wherein the attribute information of the first media track further comprises at least one of a transmission rate, a structure organization, a quality ranking, or a coding type corresponding to the coding mode of the first media track, and
   the attribute information of the second media track further comprises at least one of a transmission rate, a structure organization, a quality ranking, or a coding type corresponding to the coding mode of the second media track.

5. The method according to claim 3, wherein the alternative relationship indication information comprises an alternative level field;
   in a case that the alternative level field in the alternative relationship indication information between the playout group $P_m$ and the playout group $P_n$ is a first value, the alternative level field is used for reflecting that an alternative level between the playout group $P_m$ and the playout group $P_n$ is a media content level; and
   in a case that the alternative level field in the alternative relationship indication information between the playout group $P_m$ and the playout group $P_n$ is a second value, the alternative level field is used for reflecting that an alternative level between the playout group $P_m$ and the playout group $P_n$ is a track level.

6. The method according to claim 5, wherein in a case that the alternative level between the playout group $P_m$ and the playout group $P_n$ is the media content level, a quantity of the media track pair having the alternative relationship in the playout group $P_m$ and the playout group $P_n$ is R, R is a quantity of media tracks in the playout group $P_m$, and the quantity of media tracks in the playout group $P_m$ is the same as a quantity of tracks in the playout group $P_n$.

7. The method according to claim 5, wherein in a case that the alternative level between the playout group $P_m$ and the playout group $P_n$ is the track level, a quantity of the media track pair having the alternative relationship in the playout group $P_m$ and the playout group $P_n$ is a positive integer less than R, R is a quantity of media tracks in the playout group $P_m$, and the quantity of media tracks in the playout group $P_m$ is the same as a quantity of tracks in the playout group $P_n$.

8. The method according to claim 5, wherein in a case that the alternative level between the playout group $P_m$ and the playout group $P_n$ is the media content level, coding modes of the media tracks in the playout group $P_m$ are a first coding mode; and coding modes of the media tracks in the playout group $P_n$ are a second coding mode.

9. The method according to claim 1, wherein the media tracks in each playout group in the at least two playout groups have a joint playout relationship, and track categories of the media tracks in each playout group are different, and track categories of the media tracks in the media track pair having the alternative relationship in the every two playout groups are identical.

10. The method according to claim 1, wherein the obtaining alternative relationship indication information and alternative attribute information between every two playout groups in at least two playout groups of volumetric media comprises:
    flagging every two playout groups in the at least two playout groups to obtain alternative relationship indication information and alternative attribute information, based on a difference identification result related to the attribute information of the media tracks in a candidate media track pair.

11. The method according to claim 10, wherein the flagging every two playout groups in the at least two playout groups to obtain alternative relationship indication information and alternative attribute information comprises:

determining a candidate media track pair according to track categories of the media tracks in a playout group $P_m$ and the track categories of the media tracks in a playout group $P_n$, the media tracks in the candidate media track pair having a same track category, m and n being both positive integers less than Z, and Z being a quantity of groups of the at least two playout groups;

obtaining attribute information of the media tracks in the candidate media track pair;

performing difference identification on the attribute information of the media tracks in the candidate media track pair to obtain the difference identification result;

taking the candidate media track pair as the media track pair having the alternative relationship, and generating an alternative identifier of the media track pair in response to the difference identification result indicating that the attribute information of the media tracks in the candidate media track pair is different;

taking the alternative identifier as the alternative relationship indication information between the playout group $P_m$ and the playout group $P_n$; and taking the attribute information of the media tracks in the candidate media track pair as the alternative attribute information between the playout group $P_m$ and the playout group $P_n$.

12. The method according to claim 1, wherein the transmitting the alternative relationship indication information and the alternative attribute information to a playout terminal comprises:

encapsulating the at least two playout groups and the alternative relationship indication information and the alternative attribute information between the every two playout groups to obtain a data box of the volumetric media; and transmitting the data box comprising the at least two playout groups, the alternative relationship indication information, and the alternative attribute information to the playout terminal, so as to instruct the playout terminal to identify a target playout group matching with the playout terminal from the at least two playout groups according to the alternative relationship indication information and the alternative attribute information, and to decode the target playout group to obtain the volumetric media.

13. A data processing method for volumetric media, performed by a playout terminal, the method comprising:

obtaining alternative relationship indication information and alternative attribute information between every two playout groups in at least two playout groups of volumetric media, the alternative relationship indication information being for indicating a media track pair having an alternative relationship in every two playout groups, the every two playout groups comprising a first playout group and a second playout group, the media track pair comprising a first media track and a second media track having the alternative relationship, the first media track being included in the first playout group, the second media track being included in the second playout group, and the alternative attribute information being for reflecting an attribute difference between media tracks in the media track pair having the alternative relationship;

identifying a target playout group matching with the playout terminal from the at least two playout groups according to the alternative relationship indication information and the alternative attribute information; and decoding the target playout group to obtain the volumetric media.

14. The method according to claim 13, wherein the obtaining the alternative relationship indication information and the alternative attribute information between the every two playout groups in the at least two playout groups of volumetric media comprises:

receiving a transport protocol of the volumetric media transmitted by a service device; and parsing the transport protocol to obtain the alternative relationship indication information and the alternative attribute information.

15. The method according to claim 13, wherein the identifying the target playout group matching with the playout terminal from the at least two playout groups according to the alternative relationship indication information and the alternative attribute information comprises:

determining a group identifier of a candidate playout group matching with the playout terminal from the at least two playout groups according to the alternative relationship indication information and the alternative attribute information;

generating an obtaining request carrying the group identifier of the candidate playout group, and transmitting the obtaining request to a service device;

receiving the candidate playout group returned by the service device in response to the obtaining request; and taking the candidate playout group as the target playout group matching with the playout terminal.

16. The method according to claim 15, wherein the determining the group identifier of the candidate playout group matching with the playout terminal from the at least two playout groups comprises:

obtaining attribute information of the playout terminal, and determining a processing performance level of the playout terminal for processing the volumetric media according to the attribute information of the playout terminal;

determining a processing difficulty level of processing each playout group in the at least two playout groups according to the alternative relationship indication information and the alternative attribute information, the processing difficulty level being determined according to a quantity of processing resources consumed for processing each playout group; and taking a playout group having the processing difficulty level in the at least two playout groups matching with the processing difficulty level of the playout terminal as the candidate playout group, and obtaining the group identifier of the candidate playout group.

17. The method according to claim 15, wherein the determining the group identifier of the candidate playout group matching with the playout terminal from the at least two playout groups comprises:

obtaining a first quality ranking of the volumetric media historically played by the playout terminal;

determining a second quality ranking of each playout group in the at least two playout groups according to the alternative relationship indication information and the alternative attribute information; and taking a playout group having the second quality ranking in the at least two playout groups matching with the first quality ranking as the candidate playout group, and obtaining the group identifier of the candidate playout group.

18. The method according to claim 13, wherein the obtaining alternative relationship indication information and alternative attribute information between every two playout groups in at least two playout groups of volumetric media comprises:
  obtaining a data box of the volumetric media from the service device; and
  encapsulating the data box of the volumetric media to obtain the at least two playout groups and the alternative relationship indication information and the alternative attribute information between every two playout groups in the at least two playout groups.

19. The method according to claim 13, wherein the decoding the target playout group to obtain the volumetric media comprises:
  decoding the target playout group to obtain a media content of the volumetric media; and
  performing time synchronization on the media content to obtain the volumetric media.

20. A non-transitory computer-readable storage medium storing instructions that cause a processor to:
  obtain alternative relationship indication information and alternative attribute information between every two playout groups in at least two playout groups of volumetric media, the alternative relationship indication information being for indicating a media track pair having an alternative relationship in every two playout groups, the every two playout groups comprising a first playout group and a second playout group, the media track pair comprising a first media track and a second media track having the alternative relationship, the first media track being included in the first playout group, the second media track being included in the second playout group, and the alternative attribute information being for reflecting an attribute difference between media tracks in the media track pair having the alternative relationship;
  identify a target playout group matching with the playout terminal from the at least two playout groups according to the alternative relationship indication information and the alternative attribute information; and
  decode the target playout group to obtain the volumetric media.

* * * * *